US010368080B2

(12) United States Patent
Holcomb et al.

(10) Patent No.: US 10,368,080 B2
(45) Date of Patent: Jul. 30, 2019

(54) SELECTIVE UPSAMPLING OR REFRESH OF CHROMA SAMPLE VALUES

(71) Applicant: Microsoft Technology Licensing, LLC, Redmond, WA (US)

(72) Inventors: Thomas W. Holcomb, Bothell, WA (US); Chinweizu E. Owunwanne, Renton, WA (US); Matthew Andrews, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 118 days.

(21) Appl. No.: 15/438,507

(22) Filed: Feb. 21, 2017

(65) Prior Publication Data

US 2018/0115776 A1   Apr. 26, 2018

Related U.S. Application Data

(60) Provisional application No. 62/411,535, filed on Oct. 21, 2016.

(51) Int. Cl.
*H04N 1/64* (2006.01)
*H04N 9/64* (2006.01)
(Continued)

(52) U.S. Cl.
CPC ........... *H04N 19/186* (2014.11); *H04N 1/646* (2013.01); *H04N 9/646* (2013.01); *H04N 19/117* (2014.11);
(Continued)

(58) Field of Classification Search
CPC .... H04N 19/186; H04N 19/503; H04N 9/646; H04N 19/117; H04N 19/132; H04N 1/646
See application file for complete search history.

(56) References Cited

U.S. PATENT DOCUMENTS 5,047,853 A   9/1991   Hoffert et al.
5,379,071 A   1/1995   Parikh et al.
(Continued)

FOREIGN PATENT DOCUMENTS

CN   1627830   6/2005
CN   1722838   1/2006
(Continued)

OTHER PUBLICATIONS

Dumic et al., "Image Quality of 4:2:2 and 4:2:0 Chroma Subsampling Formats," *Int'l Symp. ELMAR*, pp. 19-24 (Sep. 2009).
(Continued)

*Primary Examiner* — Christopher S Kelley
*Assistant Examiner* — Nasim N Nirjhar
(74) *Attorney, Agent, or Firm* — Klarquist Sparkman, LLP

(57) ABSTRACT

Approaches to delivering video in a chroma sampling format with a higher chroma sampling rate (such as a YUV 4:4:4 format) using a video encoder and decoder that operate on video in another chroma sampling format with a lower chroma sampling rate (such as YUV 4:2:0) are described. A video decoder can recover stationary content in video at the higher chroma sampling rate, even when the video is encoded and decoded at the lower chroma sampling rate, without significantly increasing bit rate. In some example implementations, the approaches preserve chroma information from pictures in a higher-resolution chroma sampling format, while leveraging commercially available codecs adapted for a lower-resolution chroma sampling format such as YUV 4:2:0, which is widely supported in products.

21 Claims, 14 Drawing Sheets software 180 implementing one or more innovations for selective upsampling and/or refresh of chroma sample values

(51) Int. Cl.
*H04N 19/117* (2014.01)
*H04N 19/132* (2014.01)
*H04N 19/186* (2014.01)
*H04N 19/503* (2014.01)

(52) U.S. Cl.
CPC ......... *H04N 19/132* (2014.11); *H04N 19/503* (2014.11)

(56) References Cited

U.S. PATENT DOCUMENTS

| | | | |
|---|---|---|---|
| 5,412,428 A | 5/1995 | Tahara | |
| 5,488,430 A | 1/1996 | Hong | |
| 5,493,345 A | 2/1996 | Ishikawa et al. | |
| 5,650,824 A | 7/1997 | Huang | |
| 5,712,687 A | 1/1998 | Naveen et al. | |
| 5,742,892 A | 4/1998 | Chaddha | |
| 5,825,363 A | 10/1998 | Anderson | |
| 5,850,232 A | 12/1998 | Engstrom et al. | |
| 5,872,604 A | 2/1999 | Ogura | |
| 5,952,943 A | 9/1999 | Walsh et al. | |
| 6,208,350 B1 | 3/2001 | Herrera | |
| 6,333,952 B1* | 12/2001 | Lim | H04N 5/4401 348/E11.021 |
| 6,674,479 B2 | 1/2004 | Cook et al. | |
| 6,700,588 B1 | 3/2004 | MacInnis et al. | |
| 6,937,659 B1 | 8/2005 | Nguyen et al. | |
| 6,938,105 B2 | 8/2005 | Osa | |
| 7,012,612 B1 | 3/2006 | O'Neill et al. | |
| 7,016,547 B1 | 3/2006 | Smirnov | |
| 7,027,615 B2 | 4/2006 | Chen | |
| 7,089,284 B2 | 8/2006 | Pardikar et al. | |
| 7,111,060 B2 | 9/2006 | Araujo et al. | |
| 7,155,676 B2 | 12/2006 | Land et al. | |
| 7,222,306 B2 | 5/2007 | Kaasila et al. | |
| 7,233,619 B1 | 6/2007 | Roman | |
| 7,360,162 B2 | 4/2008 | Shaw et al. | |
| 7,415,670 B2 | 8/2008 | Hull et al. | |
| 7,472,731 B2 | 1/2009 | Arrigoni Neri et al. | |
| 7,551,792 B2 | 6/2009 | Kong et al. | |
| 7,634,230 B2 | 12/2009 | Ji et al. | |
| 7,672,005 B1 | 3/2010 | Hobbs et al. | |
| 7,770,008 B2 | 8/2010 | Walmsley | |
| 7,782,953 B2 | 8/2010 | Sriram et al. | |
| 7,847,798 B1 | 12/2010 | Parenteau et al. | |
| 7,924,292 B2 | 4/2011 | Bujold et al. | |
| 7,995,069 B2 | 8/2011 | Van Hook et al. | |
| 8,054,886 B2 | 11/2011 | Srinivasan et al. | |
| 8,106,909 B2 | 1/2012 | McDowell | |
| 8,121,423 B2 | 2/2012 | McDowell | |
| 8,126,283 B1 | 2/2012 | Garbacea et al. | |
| 8,127,233 B2 | 2/2012 | McDowell | |
| 8,139,081 B1 | 3/2012 | Daniel | |
| 8,345,768 B1 | 1/2013 | Hobbs et al. | |
| 8,358,879 B2 | 1/2013 | McDowell | |
| 8,472,731 B2 | 6/2013 | Suzuki et al. | |
| 8,520,734 B1 | 8/2013 | Xu | |
| 8,532,175 B2 | 9/2013 | Pandit et al. | |
| 8,532,424 B2 | 9/2013 | Zarubinsky et al. | |
| 8,619,877 B2 | 12/2013 | McDowell | |
| 8,625,666 B2 | 1/2014 | Bakke | |
| 8,639,057 B1 | 1/2014 | Mendhekar et al. | |
| 8,737,466 B2 | 5/2014 | Demos | |
| 8,780,996 B2 | 7/2014 | Bankoski et al. | |
| 8,787,443 B2 | 7/2014 | Sun et al. | |
| 8,787,454 B1 | 7/2014 | Chechik et al. | |
| 8,817,179 B2 | 8/2014 | Zhu et al. | |
| 8,837,826 B1 | 9/2014 | Gaddy | |
| 8,953,673 B2 | 2/2015 | Tu et al. | |
| 9,153,017 B1 | 10/2015 | Russell et al. | |
| 9,185,421 B2 | 11/2015 | Wang et al. | |
| 9,288,500 B2 | 3/2016 | Budagavi | |
| 9,661,340 B2 | 5/2017 | Sullivan et al. | |
| 9,749,646 B2 | 8/2017 | Zhu et al. | |
| 9,854,201 B2 | 12/2017 | Aharon et al. | |
| 2001/0032221 A1 | 10/2001 | Anwar | |
| 2002/0101536 A1 | 8/2002 | Cook et al. | |
| 2002/0147750 A1 | 10/2002 | Kumhyr et al. | |
| 2002/0186899 A1 | 12/2002 | Bohnenkamp | |
| 2003/0055327 A1 | 3/2003 | Shaw et al. | |
| 2003/0093568 A1 | 5/2003 | Deshpande | |
| 2003/0108248 A1 | 6/2003 | Huang et al. | |
| 2003/0179200 A1 | 9/2003 | Martin et al. | |
| 2003/0234811 A1 | 12/2003 | Kim | |
| 2004/0015981 A1 | 1/2004 | Coker et al. | |
| 2004/0036711 A1 | 2/2004 | Anderson | |
| 2004/0064518 A1 | 4/2004 | Almstrand et al. | |
| 2004/0183756 A1 | 9/2004 | Freitas et al. | |
| 2004/0184534 A1 | 9/2004 | Wang | |
| 2004/0186989 A1 | 9/2004 | Clapper | |
| 2004/0189689 A1 | 9/2004 | Barrett | |
| 2004/0221004 A1 | 11/2004 | Chalfin et al. | |
| 2004/0239681 A1 | 12/2004 | Robotham et al. | |
| 2005/0013369 A1 | 1/2005 | Lee | |
| 2005/0024384 A1 | 2/2005 | Evans et al. | |
| 2005/0052455 A1 | 3/2005 | Long et al. | |
| 2005/0053294 A1 | 3/2005 | Mukerjee et al. | |
| 2005/0071759 A1 | 3/2005 | Connors et al. | |
| 2005/0122337 A1 | 6/2005 | Chen | |
| 2005/0195203 A1 | 9/2005 | Sadanand et al. | |
| 2005/0228654 A1 | 10/2005 | Prieto et al. | |
| 2005/0246433 A1 | 11/2005 | Carrigan et al. | |
| 2005/0283798 A1 | 12/2005 | Hunleth et al. | |
| 2006/0013490 A1 | 1/2006 | Sun | |
| 2006/0031854 A1 | 2/2006 | Godwin | |
| 2006/0031917 A1 | 2/2006 | Winder et al. | |
| 2006/0050076 A1 | 3/2006 | Jeong | |
| 2006/0080382 A1 | 4/2006 | Dutta et al. | |
| 2006/0140492 A1 | 6/2006 | Akiyoshi et al. | |
| 2006/0146056 A1 | 7/2006 | Wyatt | |
| 2006/0146059 A1 | 7/2006 | Inoue et al. | |
| 2006/0158524 A1 | 7/2006 | Yang et al. | |
| 2006/0174026 A1 | 8/2006 | Robinson et al. | |
| 2006/0179118 A1 | 8/2006 | Stirbu | |
| 2006/0184614 A1 | 8/2006 | Baratto et al. | |
| 2006/0209961 A1 | 9/2006 | Han et al. | |
| 2006/0225107 A1 | 10/2006 | Seetharaman et al. | |
| 2006/0282855 A1 | 12/2006 | Margulis | |
| 2007/0019723 A1 | 1/2007 | Valente | |
| 2007/0074266 A1 | 3/2007 | Raveendran et al. | |
| 2007/0110153 A1 | 5/2007 | Cho et al. | |
| 2007/0110160 A1 | 5/2007 | Wang et al. | |
| 2007/0198656 A1 | 8/2007 | Mazzaferri et al. | |
| 2007/0236517 A1 | 10/2007 | Kimpe | |
| 2007/0242892 A1 | 10/2007 | Sugimoto et al. | |
| 2007/0261096 A1 | 11/2007 | Lin et al. | |
| 2007/0282951 A1 | 12/2007 | Selimis et al. | |
| 2007/0296721 A1 | 12/2007 | Chang et al. | |
| 2008/0024513 A1 | 1/2008 | Raveendran | |
| 2008/0043852 A1 | 2/2008 | Park et al. | |
| 2008/0069247 A1 | 3/2008 | He | |
| 2008/0094505 A1* | 4/2008 | Pai | H04N 7/012 348/452 |
| 2008/0126812 A1 | 5/2008 | Ahmed et al. | |
| 2008/0238928 A1 | 10/2008 | Poddar et al. | |
| 2008/0247461 A1 | 10/2008 | Nishida | |
| 2008/0310734 A1 | 12/2008 | Ahammad et al. | |
| 2009/0003435 A1 | 1/2009 | Cho et al. | |
| 2009/0080523 A1 | 3/2009 | McDowell | |
| 2009/0097751 A1 | 4/2009 | McDowell | |
| 2009/0100125 A1 | 4/2009 | McDowell | |
| 2009/0100483 A1 | 4/2009 | McDowell | |
| 2009/0219994 A1 | 9/2009 | Tu | |
| 2009/0225225 A1 | 9/2009 | Nakagawa et al. | |
| 2010/0020866 A1 | 1/2010 | Marpe et al. | |
| 2010/0034287 A1 | 2/2010 | Roman | |
| 2010/0046612 A1 | 2/2010 | Sun et al. | |
| 2010/0046635 A1 | 2/2010 | Pandit et al. | |
| 2010/0103953 A1 | 4/2010 | Matias et al. | |
| 2010/0104021 A1 | 4/2010 | Schmit | |
| 2011/0123128 A1 | 5/2011 | Huang et al. | |
| 2011/0199542 A1 | 8/2011 | Hirai | |
| 2011/0280316 A1 | 11/2011 | Chen | |
| 2011/0286530 A1 | 11/2011 | Tian et al. | |

(56) References Cited

U.S. PATENT DOCUMENTS

| | | |
|---|---|---|
| 2012/0008679 A1 | 1/2012 | Bakke |
| 2012/0020413 A1 | 1/2012 | Chen et al. |
| 2012/0093226 A1 | 4/2012 | Chien et al. |
| 2012/0105463 A1 | 5/2012 | McDowell |
| 2012/0133675 A1 | 5/2012 | McDowell |
| 2012/0236115 A1 | 9/2012 | Zhang et al. |
| 2012/0307904 A1 | 12/2012 | Yi et al. |
| 2013/0003840 A1 | 1/2013 | Gao et al. |
| 2013/0106998 A1 | 5/2013 | Pahalawatta et al. |
| 2013/0113884 A1 | 5/2013 | Leonatris |
| 2013/0114704 A1 | 5/2013 | Chen et al. |
| 2013/0121415 A1 | 5/2013 | Wahadaniah et al. |
| 2013/0188744 A1 | 7/2013 | Van de Auwera |
| 2013/0202201 A1 | 8/2013 | Park et al. |
| 2013/0243076 A1 | 9/2013 | Malladi |
| 2013/0272394 A1 | 10/2013 | Brockmann et al. |
| 2013/0287097 A1 | 10/2013 | Song et al. |
| 2014/0022460 A1 | 1/2014 | Li et al. |
| 2014/0040357 A1 | 2/2014 | McDowell |
| 2014/0064379 A1 | 3/2014 | Mrak et al. |
| 2014/0072027 A1 | 3/2014 | Li et al. |
| 2014/0072048 A1 | 3/2014 | Ma et al. |
| 2014/0092998 A1 | 4/2014 | Zhu et al. |
| 2014/0112394 A1 | 4/2014 | Sullivan et al. |
| 2014/0169447 A1 | 6/2014 | Hellman |
| 2014/0192261 A1 | 7/2014 | Zhu |
| 2014/0247890 A1 | 9/2014 | Yamaguchi |
| 2014/0301463 A1 | 10/2014 | Rusanovskyy et al. |
| 2014/0301464 A1 | 10/2014 | Wu |
| 2014/0341305 A1 | 11/2014 | Qu et al. |
| 2015/0010068 A1 | 1/2015 | Francois et al. |
| 2015/0016501 A1 | 1/2015 | Guo et al. |
| 2015/0016531 A1 | 1/2015 | Hannuksela |
| 2015/0063451 A1 | 3/2015 | Zhu et al. |
| 2016/0212373 A1 | 7/2016 | Aharon et al. |
| 2016/0212423 A1 | 7/2016 | Aharon et al. |
| 2016/0212433 A1 | 7/2016 | Aharon et al. |
| 2016/0277762 A1 | 9/2016 | Zhang et al. |
| 2016/0360234 A1* | 12/2016 | Tourapis ............ H04N 19/176 |
| 2017/0374384 A1* | 12/2017 | Xiu .................... H04N 19/176 |
| 2018/0091764 A1 | 3/2018 | Aharon et al. |

FOREIGN PATENT DOCUMENTS

| | | |
|---|---|---|
| CN | 101313582 | 11/2008 |
| CN | 101820541 | 9/2010 |
| CN | 102801988 | 11/2012 |
| EP | 0788282 | 8/1997 |
| EP | 2904769 | 8/2001 |
| EP | 1392062 | 2/2004 |
| EP | 1542476 | 6/2005 |
| EP | 1613097 | 1/2006 |
| EP | 2456204 | 5/2012 |
| JP | 09-139944 | 5/1997 |
| JP | 2001-197499 | 7/2001 |
| JP | 2004-120134 | 4/2004 |
| JP | 2005-176383 | 6/2005 |
| JP | 2005-318490 | 11/2005 |
| JP | 2006-157443 | 6/2006 |
| JP | 2010-110007 | 5/2010 |
| JP | 2010-531609 | 9/2010 |
| KR | 20040038388 | 5/2004 |
| KR | 20050083432 | 8/2005 |
| WO | WO 99/37097 | 7/1999 |
| WO | WO 2005/008600 | 1/2005 |
| WO | WO 2006/074110 | 7/2006 |
| WO | WO 2008/143156 | 11/2008 |
| WO | WO 2009/002061 | 12/2008 |
| WO | WO 2013/128010 | 9/2013 |
| WO | WO 2017/039845 | 3/2017 |

OTHER PUBLICATIONS

Khairat et al., "Adaptive Cross-Component Prediction for 4:4:4 High Efficiency Video Coding," *Int'l Conf. on Image Processing*, pp. 3734-3738 (Oct. 2014).

Ali et al., "Survey of Dirac: A Wavelet Based Video Codec for Multiparty Video Conference and Broadcasting," *Intelligent Video Event Analysis & Understanding*, pp. 211-247 (Jan. 2011).

Bross et al., "High Efficiency Video Coding (HEVC) Text Specification Draft 7," JCTVC-I1003_d5, 294 pp. (Apr. 2012).

Bross et al., "High efficiency video coding (HEVC) text specification draft 8," JCTVC-J1003_d7, 260 pp. (Jul. 2012).

Bross et al., "High Efficiency Video Coding (HEVC) Text Specification Draft 9," JCTVC-K1003, 311 pp. (Oct. 2012).

Bross et al., "High Efficiency Video Coding (HEVC) Text Specification Draft 10 (for FDIS & Last Call)," JCTVC-L1003, 310 pp. (Jan. 2013).

Bross et al., "Proposed Editorial Improvements for High Efficiency Video Coding (HEVC) Text Specification Draft 8," JCTVC-K0030, 276 pp. (Oct. 2012).

Calderbank et al., "Wavelet Transforms That Map Integers to Integers," *Applied and Computational Harmonic Analysis*, vol. 5, pp. 332-369 (1998).

Chen et al., "R-D Cost Based Effectiveness Analysis of Dual-coder Mixed Chroma-sampling-rate (DMC) Coding for 4:4:4 Screen Content," JCTVC-J0353, 6 pp. (Jul. 2012).

Cohen et al., "Biorthogonal Bases of Compactly Supported Wavelets," Communications on Pure and Applied Mathematics, pp. 485-560 (1992).

Communication Pursuant to Rules 161(1) and 162 EPC dated May 11, 2015, from European Patent Application No. 13774029.6, 2 pp.

Communication Pursuant to Rules 161(1) and 162 EPC dated Jun. 3, 2015, from European Patent Application No. 13789089.3, 2 pp.

Communication Pursuant to Article 94(3) EPC dated Mar. 16, 2017, from European Patent Application No. 13789089.3, 4 pp.

Communication pursuant to Article 94(3) EPC dated Jun. 18, 2018, from European Patent Application No. 13774029.6, 9 pp.

Communication pursuant to Article 94(3) EPC dated Nov. 8, 2013, from European Patent Application No. 08799548.6, 4 pp.

Communication pursuant to Article 94(3) EPC dated Aug. 19, 2015, from European Patent Application No. 08799548.6, 7 pp.

Deb et al., "RepVis: A Remote Visualization System for Large Environments," *Proc. Workshop on Computer Graphics, Vision and Image Processing*, 4 pp. (Feb. 2004).

Decision of Refusal dated May 8, 2018, from Japanese Patent Application No. 2015-538079, 11 pp.

Ding et al., "Motion-based Adaptive GOP Algorithms for Efficient H.264/AVC Compression," *Proc. Joint Conf. on Information Sciences, Part of Series: Advances in Intelligent Systems Research*, 4 pp. (Oct. 2006).

Extended European Search Report dated Aug. 10, 2011, from European Patent Application No. 08799548.6, 9 pp.

Final Office Action dated Dec. 21, 2011, from U.S. Appl. No. 11/870,960, 14 pp.

Final Office Action dated Mar. 22, 2011, from U.S. Appl. No. 11/872,004, 15 pp.

Final Office Action dated Mar. 19, 2015, from U.S. Appl. No. 13/347,643, 8 pp.

Final Office Action dated Apr. 27, 2016, from U.S. Appl. No. 13/347,643, 10 pp.

Final Office Action dated Mar. 9, 2016, from U.S. Appl. No. 14/027,028, 18 pp.

Final Office Action dated Mar. 30, 2016, from U.S. Appl. No. 14/027,013, 22 pp.

Final Office Action dated Jan. 4, 2016, from U.S. Appl. No. 14/051,202, 17 pp.

First Office Action dated Jun. 19, 2017, from Chinese Patent Application No. 201380051471.9, 17 pp.

First Office Action dated Aug. 18, 2017, from Chinese Patent Application No. 201380055253.2, 13 pp.

(56) References Cited

OTHER PUBLICATIONS

Fleet et al., "Design and Use of Linear Models for Image Motion Analysis," *Int'l Journal of Computer Vision*, vol. 36, Issue 3, 40 pp. (Feb. 2000).
Flynn et al., "High Efficiency Video Coding (HEVC) Range Extensions Text Specification: Draft 3," JCTVC-M1005, 315 pp. (Apr. 2013).
Gold, "Stop Worrying About Compression With an On-Camera Video Recorder," downloaded from http://www.bhphotovideo.com/indepth/video/hands-reviews/stop-worrying-about-compression-camera-video-recorder, 6 pp. (Jul. 2012).
He et al., "De-Interlacing and YUV 4:2:2 to 4:2:0 Conversion on TMS320DM6446 Using the Resizer," Texas Instruments Application Report SPRAAK3B, 18 pp. (Dec. 2008).
He et al., "Optimum Bit Allocation and Accurate Rate Control for Video Coding via ρ-Domain Source Modeling," *IEEE Trans. on Circuits and Systems for Video Technology*, vol. 12, No. 10, pp. 840-849 (Oct. 2002).
He et al., "ρ-Domain Bit Allocation and Rate Control for Real Time Video Coding," *Int'l Conf. on Image Processing*, pp. 546-549 (Oct. 2001).
"HEVC Software Repository," downloaded from https://hevc.hhi.fraunhofer.de/svn/svn_HEVCSoftware/, 1 p. (downloaded on Sep. 17, 2013).
International Preliminary Report on Patentability dated Apr. 13, 2017, from International Patent Application No. PCT/US2016/013121, 20 pp.
International Preliminary Report on Patentability dated May 7, 2015, from International Patent Application No. PCT/US2013/065754, 7 pp.
International Preliminary Report on Patentability dated Sep. 20, 2016, from International Patent Application No. PCT/US2016/012249, 8 pp.
International Preliminary Report on Patentability dated Nov. 25, 2016, from International Patent Application No. PCT/US2016/013120, 13 pp.
International Preliminary Report on Patentability dated Apr. 1, 2010, from International Patent Application No. PCT/US08/76385, 4 pp.
International Preliminary Report on Patentability dated Apr. 16, 2015, from International Patent Application No. PCT/US2013/061784, 11 pp.
International Search Report and Written Opinion dated Jan. 22, 2014, from International Patent Application No. PCT/US2013/065754, 8 pp.
International Search Report and Written Opinion dated Dec. 2, 2013, from International Patent Application No. PCT/US2013/061784, 15 pp.
International Search Report and Written Opinion dated Apr. 21, 2016, from International Patent Application No. PCT/US2016/013121, 15 pp.
International Search Report and Written Opinion dated Jan. 16, 2018, from International Patent Application No. PCT/US2017/055817, 20 pp.
International Search Report and Written Opinion dated Apr. 13, 2016, from International Patent Application No. PCT/US2016/012249, 16 pp.
International Search Report and Written Opinion dated Jun. 17, 2016, from International Patent Application No. PCT/US2016/013119, 12 pp.
International Search Report and Written Opinion dated Aug. 2, 2016, from International Patent Application No. PCT/US2016/03120, 20 pp.
International Search Report and Written Opinion dated Mar. 16, 2009, from International Patent Application No. PCT/US08/76385, 11 pp.
International Search Report and Written Opinion dated Jun. 28, 2017, from International Patent Application No. PCT/US17/026251, 15 pp.

ISO/IEC, "Information Technology—JPEG 2000 Image Coding System—Part 11: Wireless," ISO/IEC FCD 15444-11, 72 pp. (Mar. 2005).
ISO/IEC, "ISO/IEC 11172-2, Information Technology—Coding of Moving Pictures and Associated Audio for Digital Storage Media at up to About 1.5 Mbit/s," 122 pp. (Aug. 1993).
ISO/IEC, "Information Technology—Coding of Audio-Visual Objects: Visual, ISO/IEC 14496-2, Committee Draft," 330 pp. (Mar. 1998).
ISO/IEC, "Information Technology—Coding of Audio-Visual Objects—Part 10: Advanced Video Coding," ISO/IEC 14496-10, 7th edition, 720 pp. (May 2012).
ITU-R, Recommendation ITU-R BT.601-7, "Studio Encoding Parameters of Digital Television for Standard 4:3 and Wide-screen 16:9 Aspect Ratios," 19 pp. (Mar. 2011).
ITU-R, Recommendation ITU-R BT.709-5, "Parameter Values for the HDTV Standards for Production and International Programme Exchange," 32 pp. (Apr. 2002).
ITU-R, Recommendation ITU-R BT.2020, "Parameter Values for Ultra-high Definition Television Systems for Production and International Programme Exchange," 7 pp. (Aug. 2012).
ITU-T, "ITU-T Recommendation H.261, Video Codec for Audiovisual Services at p × 64 kbits," 28 pp. (Mar. 1993).
ITU-T, "ITU-T Recommendation H.262, Information Technology—Generic Coding of Moving Pictures and Associated Audio Information: Video," 218 pp. (Jul. 1995).
ITU-T, "ITU-T Recommendation H.263, Video Coding for Low Bit Rate Communication," 167 pp. (Feb. 1998).
ITU-T, H.264, "Advanced Video Coding for Generic Audiovisual Services," 680 pp. (Jan. 2012).
ITU-T, T.800, "Information Technology—JPEG 2000 Image Coding System: Core Coding System," 217 pp. (Aug. 2002).
Jonson, "Motion Detection in Sequences using Optic Flow," 23 pp. (document not dated).
Kauff et al., "Fast Motion Estimation for Real-Time Shape-Adaptive MPEG-4 Video Encoding," *Proc. ACM Multimedia Workshops*, 4 pp. (Nov. 2000).
Jin et al., "Resynchronization and Remultiplexing for Transcoding to H.264/AVC," *Journal of Zhejiang University Science A*, pp. 76-81 (Jan. 2006).
Le Gall et al., "Sub-band Coding of Digital Images Using Symmetric Short Kernel Filters and Arithmetic Coding Techniques," *IEEE Trans. on Acoustics, Speech, and Signal Processing*, pp. 761-764 (Apr. 1988).
Lin et al., "Mixed Chroma Sampling-Rate coding: combining the merits of 4:4:4 and 4:2:0 and increasing the value of past 4:2:0 investment," JCTVC-H0065, 5 pp. (Feb. 2012).
Lin et al., "Mixed Chroma Sampling-Rate High Efficiency Video Coding for Full-Chroma Screen Content," *IEEE Trans. On Circuits and Systems for Video Technology*, vol. 23, No. 1, pp. 173-185 (Jan. 2013).
Lin et al., "Syntax and Semantics of Dual-coder Mixed Chroma-sampling-rate (DMC) Coding for 4:4:4 Screen Content," JCTVC-J0233, 4 pp. (Jul. 2012).
Liu, "New Change Detection Models for Object-Based Encoding of Patient Monitoring Video," Ph.D. Thesis, University of Pittsburgh, 147 pp. (2005).
Ma et al., "De-Ringing Filter for Scalable Video Coding," *IEEE Int'l Conf. on Multimedia and Expo Workshops*, 4 pp. (Jul. 2013).
Microsoft Corporation, "ClearType Information," downloaded from http://www.microsoft.com/typography/cleartypeinfo.mspx, 2 pp. (Jan. 2010).
Microsoft Corporation, "Microsoft RemoteFX," downloaded from http://technet.microsoft.com/en-us/library/ff817578(WS.10).aspx, 10 pp. (Feb. 2011).
Mohanbabu et al., "Chroma Subsampling Based Compression of Bayer-Pattern Video Sequences using Gradient Based Interpolation," *European Journal of Scientific Research*, vol. 86, No. 4, pp. 556-564 (Sep. 2012).
Moore et al., "Optimal Parallel MPEG Encoding," *Proc. Computer Science Technical Report*, Cornell University, 5 pp. (May 1996).
Notice of Allowance dated Mar. 28, 2018, from U.S. Appl. No. 15/822,590, 9 pp.

(56) References Cited

OTHER PUBLICATIONS

Notification of Reasons for Refusal dated Jun. 20, 2017, from Japanese Patent Application No. 2015-534632, 6 pp.
Notification of Second Office Action dated Apr. 4, 2018, from Chinese Patent Application No. 201380051471.9, 8 pp.
Office Action dated May 23, 2016, from European Patent Application No. 13789089.3, 6 pp.
Office Action dated Aug. 15, 2017 received in Japanese Patent Application No. 2015-538079, 10 pp.
Office Action dated May 11, 2011, from U.S. Appl. No. 11/860,008, 9 pp.
Office Action dated Mar. 5, 2013, from U.S. Appl. No. 11/870,960, 20 pp.
Office Action dated Aug. 25, 2011, from U.S. Appl. No. 11/870,960, 21 pp.
Office Action dated May 20, 2011, from U.S. Appl. No. 11/871,719, 5 pp.
Office Action dated Jun. 28, 2011, from U.S. Appl. No. 11/871,719, 7 pp.
Office Action dated Oct. 22, 2010, from U.S. Appl. No. 11/872,004, 14 pp.
Office Action dated Nov. 19, 2014, from U.S. Appl. No. 13/347,643, 6 pp.
Office Action dated Sep. 28, 2015, from U.S. Appl. No. 13/347,643, 11 pp.
Office Action dated Dec. 1, 2016, from U.S. Appl. No. 14/027,013, 21 pp.
Office Action dated May 15, 2017, from U.S. Appl. No. 14/027,013, 23 pp.
Office Action dated Sep. 21, 2015, from U.S. Appl. No. 14/027,028, 13 pp.
Office Action dated Oct. 6, 2015, from U.S. Appl. No. 14/027,013, 18 pp.
Office Action dated Sep. 11, 2015, from U.S. Appl. No. 14/051,202, 10 pp.
Office Action dated Feb. 7, 2017, from U.S. Appl. No. 14/599,412, 10 pp.
Office Action dated Jan. 20, 2017, from U.S. Appl. No. 14/599,415, 10 pp.
Office Action dated Jan. 12, 2017, from U.S. Appl. No. 14/599,416, 11 pp.
Olson et al., "Remote Rendering Using Vtk and Vic," downloaded from http://www.osti.gov/bridge/servlets/purl/764263-Hygv8Y/webviewable/764263.pdf, 4 pp. (Sep. 2000).
Patchoo et al., "Gaussian-Mixture Modeling of Lattice-Based Spherical Vector Quantization Performance in Transform Audio Coding," *Int'l Conf. on Acoustics Speech and Signal Processing*, pp. 373-376 (Mar. 2010).
PCT International Preliminary Report on Patentability in PCT/US2016/013119, dated Apr. 19, 2017, 5 pages.
Rao et al., *Techniques and Standards for Image, Video, and Audio Coding*, Prentice-Hall, Ch. 2, pp. 9-16 (1996).
Reddy et al., "Subband Decomposition for High-Resolution Color in HEVC and AVC 4:2:0 Video Coding Systems," Microsoft Research Tech Report MSR-TR-2014-31, 12 pp. (Mar. 2014).
Response to European Office Action dated Mar. 8, 2012, from European Patent Application No. 08799548.6, 18 pp.
Response to European Office Action dated Mar. 10, 2014, from European Patent Application No. 08799548.6, 9 pp.
Response to European Office Action dated Oct. 22, 2015, from European Patent Application No. 08799548.6, 5 pp.
Response to U.S. Office Action dated Mar. 20, 2012, from U.S. Appl. No. 11/870,960, 13 pp.
"Rich Server Platform-User Interface Proposal for Rich Server Platform-User Interface Framework (RSP-UI)", Retrieved from: http://www.eclipse.org/proposals/rsp/, Jun. 13, 2007,7 Pages.
Rossholm et al., "Adaptive De-Blocking De-Ringing Post Filter," *IEEE Int'l Conf. on Image Process*, vol. 2, 4 pp. (Sep. 2005).
Rothweiler, "Polyphase Quadrature Filters—A New Subband Coding Technique," *IEEE Trans. on Acoustics, Speech, and Signal Processing*, pp. 1280-1283 (Apr. 1983).
Schwarz et al., "Overview of the Scalable Video Coding Extension of the H.264/AVC Standard," *IEEE Trans. on Circuits and Systems for Video Technology*, vol. 17, No. 9, pp. 1103-1120 (Sep. 2007).
Smith et al., "Exact Reconstruction Techniques for Tree-Structured Subband Coders," *IEEE Trans. on Acoustics, Speech, and Signal Processing*, vol. ASSP-34, No. 3, pp. 434-441 (Jun. 1986).
SMPTE 421M, "VC-1 Compressed Video Bitstream Format and Decoding Process," 493 pp. (Feb. 2006).
SMPTE, "Proposed SMPTE Standard for Television: VC-1 Compressed Video Bitstream Format and Decoding Process," 500 pp. (Aug. 2005).
Su et al., "Image Interpolation by Pixel Level Data-Dependent Triangulation," *Computer Graphics Fourm*, 13 pp. (Jun. 2004).
Sullivan et al., "Recommended 8-Bit YUV Formats for Video Rendering," downloaded from the World Wide Web, 9 pp. (document marked: Apr. 2002, updated Nov. 2008).
Sullivan et al., "Overview of the High Efficiency Video Coding (HEVC) Standard," *IEEE Trans. on Circuits and Systems for Video Technology*, vol. 22, No. 12, pp. 1649-1668 (Dec. 2012).
Sweldens, "The Lifting Scheme: A Construction of Second Generation Wavelets," to appear in *SIAM Journal on Mathematical Analysis*, 42 pp. (May 1995).
Turaga et al., "Estimation and Mode Decision for Spatially Correlated Motion Sequences," *IEEE Trans. On Circuits and Systems for Video Technology*, vol. 11, No. 10, 30 pp. (2001).
Uytterhoeven et al., "Wavelet Based Interactive Video Communication and Image Database Consulting—Wavelet Transforms Using the Lifting Scheme," 24 pp. (Apr. 1997).
Vetro, "Frame Compatible Formats for 3D Video Distribution," Mitsubishi Electric Research Laboratories TR2010-099, 6 pp. (Nov. 2010).
Villasenor et al., "Wavelet Filter Evaluation for Image Compression," *IEEE Trans. on Image Processing*, vol. 4, No. 8, pp. 1053-1060 (Aug. 1995).
Wan et al., "Perceptually Adaptive Joint Deringing-Deblocking Filtering for Scalable Video Transmission over Wireless Networks," *Proc. of Signal Processing: Image Communication*, vol. 22, Issue 3, 25 pp. (Mar. 2007).
Wiegand et al., "Overview of the H.264/AVC Video Coding Standard," *IEEE Trans. on Circuits and Systems for Video Technology*, vol. 13, No. 7,pp. 560-576 (Jul. 2003).
Wiegand, "Study of Final Committee Draft of Joint Video Specification (ITU-T Rec. H.264 | ISO/IEC 14496-10 AVC)" JVT-F100, 242 pp. (Dec. 2002).
Wikipedia, "Chroma Subsampling," 8 pp. (last modified Aug. 20, 2013).
Wong, "Enhancement and Artifact Removal for Transform Coded Document Images," powerpoint slides, 45 pp. (Apr. 2010).
Wong et al., "Operating System Support for Multi-User, Remote, Graphical Interaction," *USENIX Annual Technical Conf.*, 13 pp. (Jun. 2000).
Written Opinion of the International Preliminary Examining Authority dated Dec. 12, 2016, form International Patent Application No. PCT/US2016/013119, 5 pp.
Written Opinion of the International Preliminary Examining Authority dated Jan. 24, 2017, from International Patent Application No. PCT/US2016/013121, 9 pp.
Wu et al., "Frame Packing Arrangement SEI for 4:4:4 Content in 4:2:0 Bitstreams," JCTVC-K0240, 6 pp. (Oct. 2012).
Wu et al., "Tunneling High-Resolution Color Content through 4:2:0 HEVC and AVC Video Coding Systems," *IEEE Data Compression Conf.*, 10 pp. (Mar. 2013).
Yang et al., "The Performance of Remote Display Mechanisms for Thin-Client Computing," *USENIX Annual Technical Conf.*, 15 pp. (2002).
Ying et al., "4:2:0 Chroma Sample Format for Phase Difference Eliminating and Color Space Scalability," JVT-0078, 13 pp. (Apr. 2005.).

(56) References Cited

OTHER PUBLICATIONS

Zhang et al., "Additional Experiment Results for Frame Packing Arrangement SEI Message for 4:4:4 Content in 4:2:0 Bitstreams," JCTVC-M0281, 11 pp. (Apr. 2013).

Zhang et al., "BD-rate Performance vs. Dictionary Size and Hash-table Memory Size in Dual-coder Mixed Chroma-sampling-rate (DMC) Coding for 4:4:4 Screen Content," JCTVC-J0352, 3 pp. (Jul. 2012).

Zhang et al., "Updated Proposal for Frame Packing Arrangement SEI for 4:4:4 Content in 4:2:0 Bitstreams," JCTVC-L0316, 10 pp. (Jan. 2013).

Zhang et al., "Updated Proposal with Software for Frame Packing Arrangement SEI Message for 4:4:4 Content in 4:2:0 Bitstreams," JCTVC-N0270, 9 pp. (Aug. 2013).

Zimmermann et al., "Universal Remote Console—Prototyping for the Alternate Interface Access Standard," *ERCIM Int'l Workshop on User Interfaces*, 9 pp. (Oct. 2002).

\* cited by examiner software 180 implementing one or more innovations for selective upsampling and/or refresh of chroma sample values

300

340

360

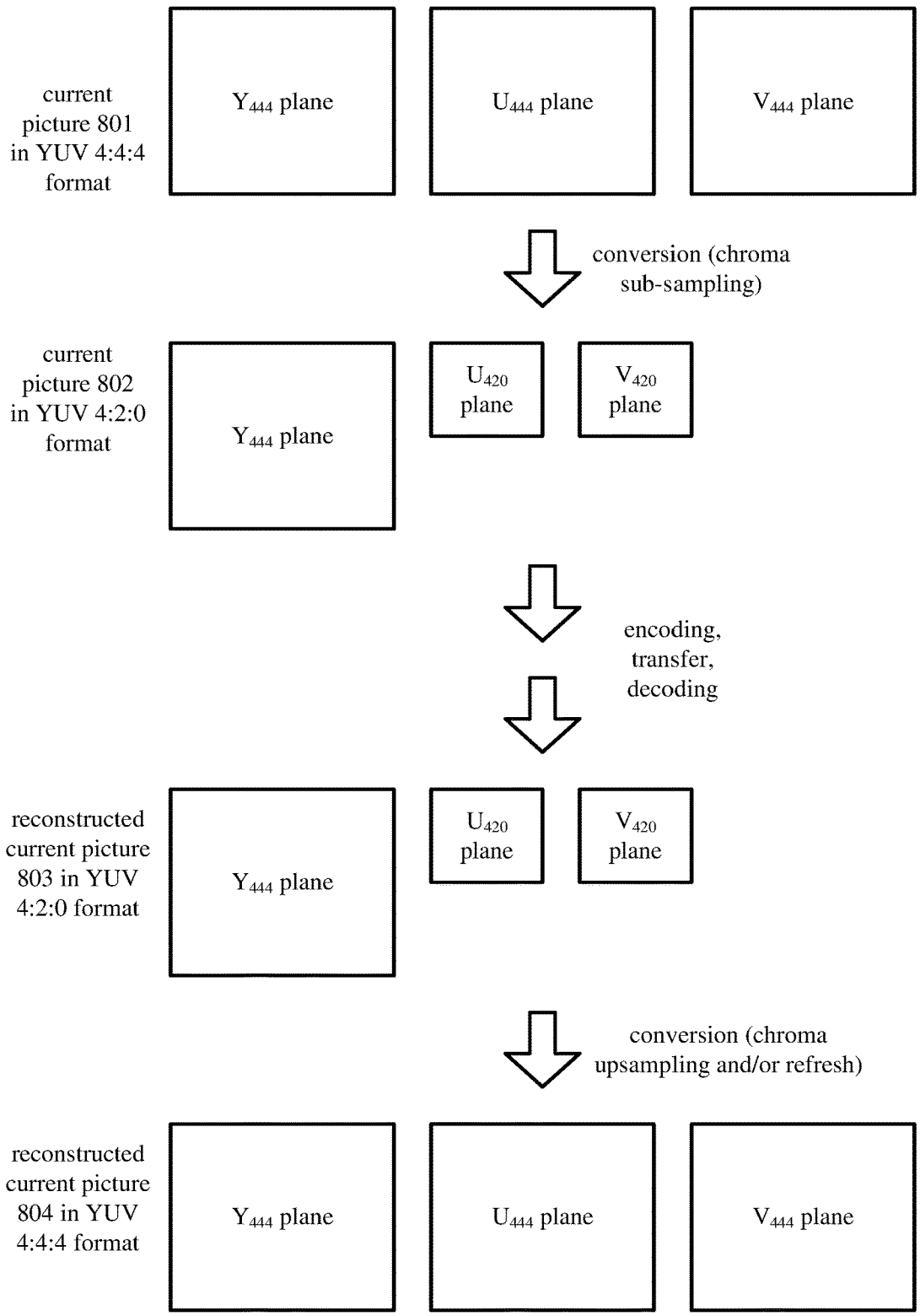

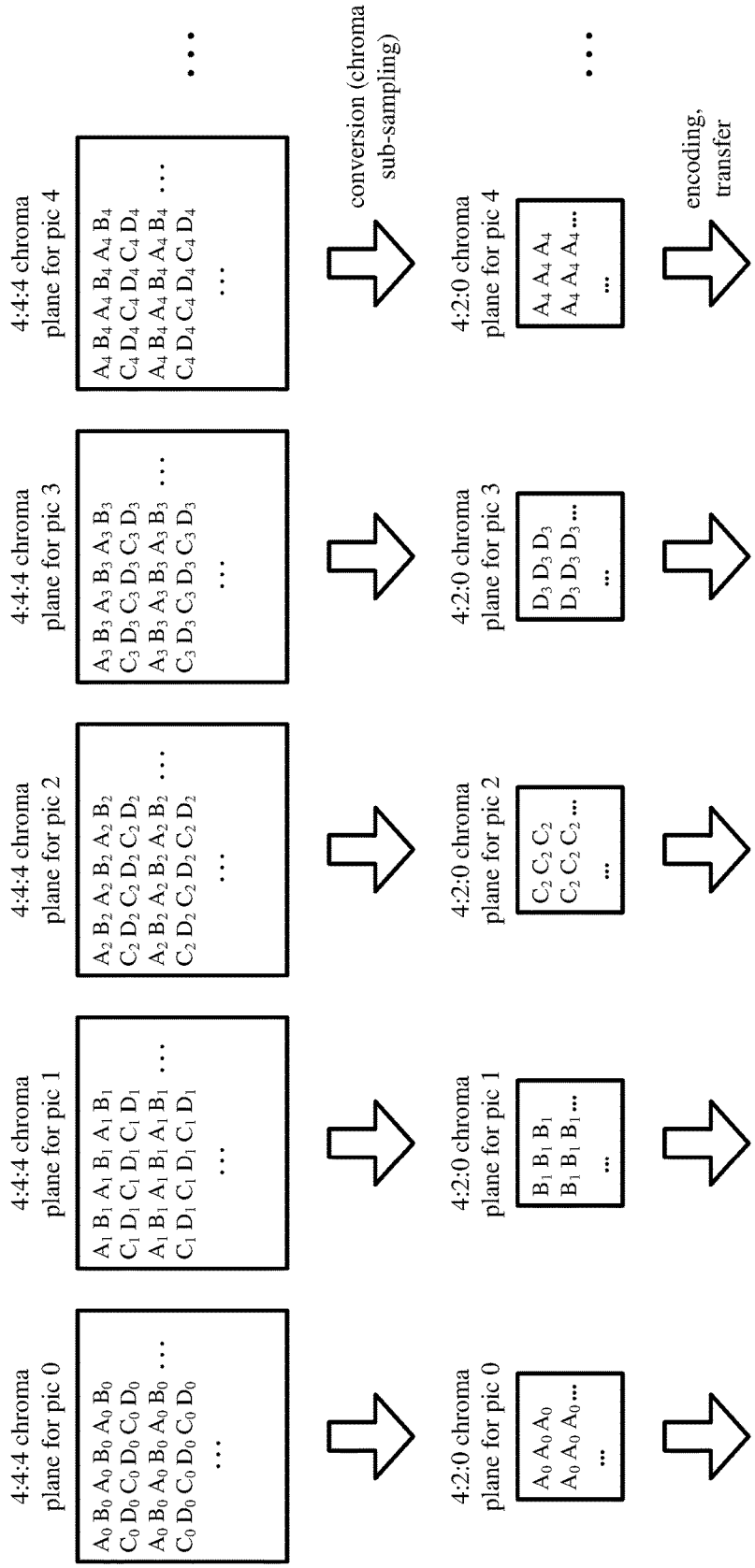

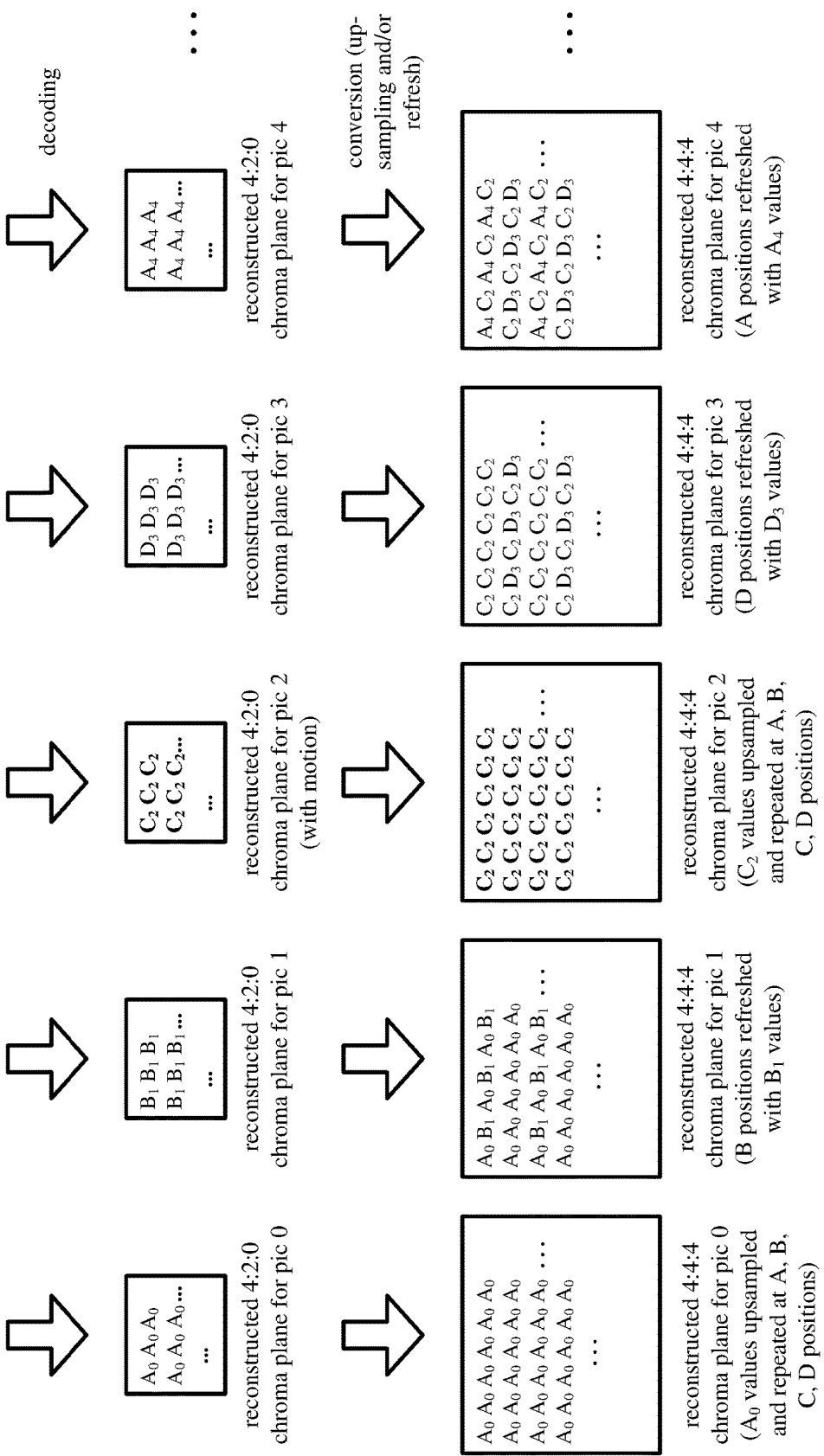

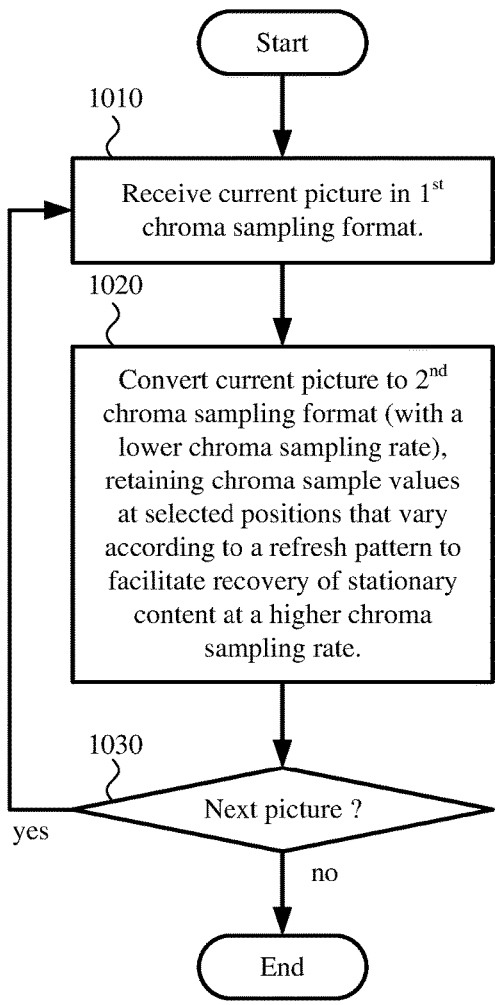
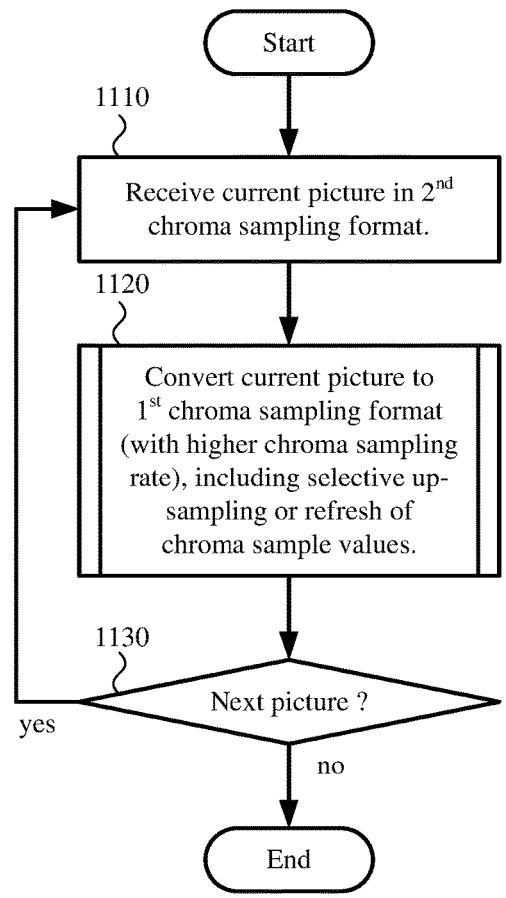

SELECTIVE UPSAMPLING OR REFRESH OF CHROMA SAMPLE VALUES

CROSS REFERENCE TO RELATED APPLICATION

This application claims the benefit of U.S. Provisional Patent Application No. 62/411,535, filed Oct. 21, 2016, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263, H.264 (MPEG-4 AVC or ISO/IEC 14496-10), and H.265 standards and the MPEG-1 (ISO/IEC 11172-2), MPEG-4 Visual (ISO/IEC 14496-2) and SMPTE 421M standards. A video codec standard typically defines options for the syntax of an encoded video bitstream, detailing parameters in the bitstream when particular features are used in encoding and decoding. In many cases, a video codec standard also provides details about the decoding operations a decoder should perform to achieve conformant results in decoding. Aside from codec standards, various proprietary codec formats such as VP8 and VP9 define options for the syntax of an encoded video bitstream and corresponding decoding operations.

A video source such as a camera, animation output, screen capture module, etc. typically provides video that is converted to a format such as a YUV 4:4:4 chroma sampling format. In a YUV format, sample values of a luma (Y) component represent brightness or intensity values, and sample values of chroma (U, V) components represent chroma values. In a YUV 4:4:4 format, chroma information is represented at the same spatial resolution as luma information.

Many commercially available video encoders and decoders support only a YUV 4:2:0 chroma sampling format. A YUV 4:2:0 format is a format that sub-samples chroma information compared to a YUV 4:4:4 format, so that chroma resolution is half that of luma resolution both horizontally and vertically. As a design principle, the decision to use a YUV 4:2:0 format for encoding/decoding is premised on the understanding that, for most use cases such as encoding/decoding of natural camera-captured video content, viewers do not ordinarily notice many visual differences between video encoded/decoded in a YUV 4:2:0 format and video encoded/decoded in a YUV 4:4:4 format. The compression advantages for the YUV 4:2:0 format, which has fewer sample values per frame, are therefore compelling. There are some use cases, however, for which video has richer color information and higher color fidelity may be justified. In such use cases, the differences between YUV 4:4:4 and YUV 4:2:0 chroma sampling formats are more easily perceived by viewers. For example, for encoding/decoding of computer screen text content, animated video content with artificial hard-edged boundaries, or certain features of video content more generally (such as scrolling titles and hard-edged graphics, or video with information concentrated in chroma channels), a 4:4:4 format may be preferable to a 4:2:0 format. Although screen capture codecs that support encoding and decoding in a 4:4:4 format are available, the lack of widespread support for codecs supporting 4:4:4 formats (especially with respect to hardware codec implementations) is a hindrance for these use cases.

SUMMARY

In summary, the detailed description presents innovations in delivery of video in a chroma sampling format with a higher chroma sampling rate (such as a YUV 4:4:4 format) using a video encoder and decoder that operate on video in another chroma sampling format with a lower chroma sampling rate (such as YUV 4:2:0). In many scenarios, the innovations enable recovery of stationary content in video at the higher chroma sampling rate, even when the video is encoded and decoded at the lower chroma sampling rate, without significantly increasing bit rate.

Innovative features of encoder-side activity are described below. In particular, various aspects of a pre-processor that performs chroma sub-sampling operations before encoding are described and claimed. For example, a pre-processor receives a current picture in a first chroma sampling format (e.g., a YUV 4:4:4 format), which has a first chroma sampling rate. The pre-processor converts the current picture to a second chroma sampling format (e.g., a YUV 4:2:0 format), which has a second chroma sampling rate lower than the first chroma sampling rate. In doing so, the pre-processor retains chroma sample values of the current picture in the first chroma sampling format that are at selected positions among positions of the first chroma sampling format. The selected positions vary according to a refresh pattern that facilitates recovery of stationary content at the first chroma sampling rate. The pre-processor discards chroma sample values of the current picture in the first chroma sampling format that are at other, non-selected positions among the positions of the first chroma sampling format. In this way, the pre-processor can retain chroma sample values at different positions in different pictures, but over a short period (e.g., four pictures) retain chroma sample values at all of the positions of the first chroma sampling format, collectively.

Innovative features of corresponding decoder-side activity are also described below. In particular, various aspects of a post-processor that performs selective chroma upsampling operations and/or refresh operations are described and claimed. The post-processor can perform refresh operations for chroma sample values in stationary regions, but perform upsampling operations for chroma sample values in non-stationary regions. For example, a post-processor receives a current picture in the second chroma sampling format (e.g., a YUV 4:2:0 format). The post-processor converts the current picture to the first chroma sampling format (e.g., a YUV 4:4:4 format). In doing so, for each of one or more regions of the current picture, the post-processor can determine whether the region is stationary. If so, within the region, the post-processor can: (1) at selected positions (which vary according to the refresh pattern), refresh chroma sample values in the first chroma sampling format using chroma sample values of the current picture in the second chroma sampling format, and (2) at other, non-selected positions, retain chroma sample values reconstructed from one or more previous pictures, in display order, in the second chroma sampling format. Otherwise (the region is not stationary), the post-processor can, within the region, for all of the positions of the first chroma sampling format, upsample the chroma sample values of the current picture in the second chroma sampling format. By refreshing chroma sample values in stationary regions using chroma sample values retained at different positions in different pictures, the post-processor can recover stationary content in video at the higher chroma sampling rate, even when the video is encoded and decoded at the lower chroma sampling rate.

The innovations can be implemented as part of a method, as part of a computer system configured to perform operations for the method, or as part of one or more computer-readable media storing computer-executable instructions for causing a computer system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 8 is a diagram illustrating a generalized example of chroma sub-sampling as well as selective upsampling and/or refresh of chroma sample values.

FIG. 9a is a diagram illustrating an example of chroma sub-sampling, and FIGS. 9b-9d are diagrams illustrating various examples of selective upsampling and/or refresh of chroma sample values.

FIGS. 10 and 11 are flowcharts illustrating generalized techniques for pre-processing and post-processing, respectively, for recovery of stationary content at a higher chroma sampling rate.

DETAILED DESCRIPTION

Figure 1:
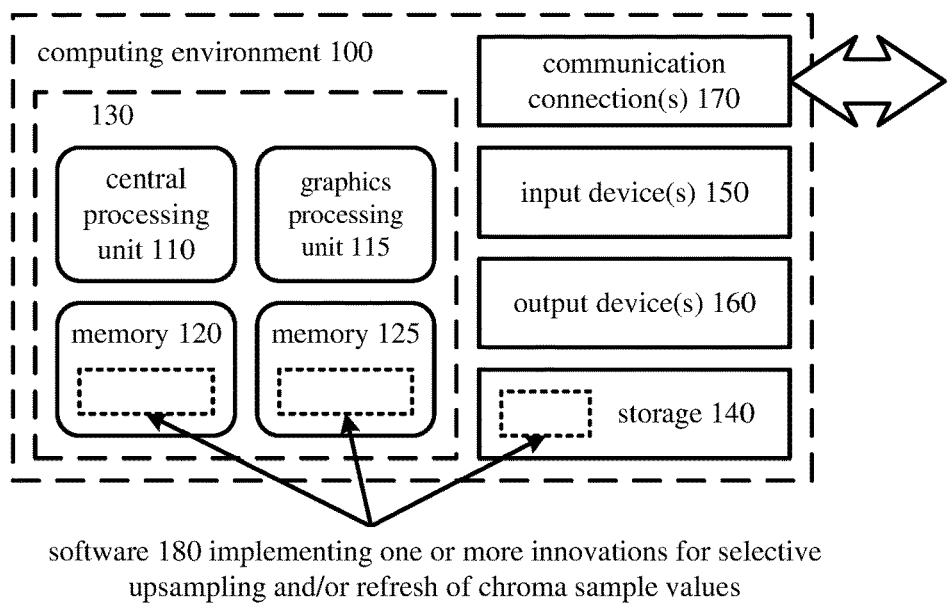
FIG. 1 is a diagram illustrating an example computing system in which some described embodiments can be implemented.

A video source such as a camera, animation output, screen capture module, etc. typically provides video that is converted to a format such as a YUV 4:4:4 chroma sampling format. In a YUV format, sample values of a luma (Y) component represent brightness or intensity values, and sample values of chroma (U, V) components represent chroma values. Many commercially available video encoders and decoders support only a YUV 4:2:0 chroma sampling format. YUV 4:2:0 is a format that sub-samples chroma information compared to a YUV 4:4:4 format, which preserves full-resolution chroma information (that is, chroma information is represented at the same resolution as luma information). As a design principle, the decision to use a YUV 4:2:0 format for encoding/decoding is premised on the understanding that, for most use cases such as encoding/decoding of natural camera-captured video content, viewers do not ordinarily notice many visual differences between video encoded/decoded in a YUV 4:2:0 format and video encoded/decoded in a YUV 4:4:4 format. Because the human visual system is more sensitive to spatial resolution of luma content than the spatial resolution of chroma content, in many cases chroma sample values can be aggressively sub-sampled without hurting the quality of video (as perceived by viewers). The compression advantages for the YUV 4:2:0 format, which has fewer sample values per frame, are therefore compelling.

There are some use cases, however, for which differences between the two chroma sampling formats are more easily perceived by viewers. For example, typical content of a computer screen or a graphical presentation (such as a slide of a slide show) includes objects represented by a single color, with sharp boundaries against a background color (e.g., blue text against a white background). Chroma sub-sampling often degrades the appearance of such content noticeably. More generally, for encoding/decoding of computer screen text content (especially text rendered using ClearType technology), animated video content with artificial hard-edged boundaries, or certain features of video content more generally (such as scrolling titles and hard-edged graphics, or video with information concentrated in chroma channels), chroma sub-sampling may lead to perceptible distortion. Although using a 4:4:4 chroma sampling format yields better results, it can increase bit rate significantly, and the lack of widespread support for video codecs supporting 4:4:4 chroma sampling formats (especially with respect to hardware codec implementations) is a hindrance for these use cases.

The detailed description presents various innovations in delivery of video in a chroma sampling format with a higher chroma sampling rate (such as a YUV 4:4:4 format) using a video encoder and decoder that operate on video in another chroma sampling format with a lower chroma sampling rate (such as YUV 4:2:0). In many scenarios, the innovations enable recovery of stationary content in video at the higher chroma sampling rate, even when the video is encoded and decoded at the lower chroma sampling rate, without significantly increasing bit rate. Also, approaches described herein can alleviate the shortcomings of many prior approaches by preserving chroma information from pictures in a higher-resolution chroma sampling format, while leveraging commercially available codecs adapted for a lower-resolution chroma sampling format. In particular, since YUV 4:2:0 is a widely supported chroma sampling format in products (especially with respect to hardware codec implementations), having an effective way of conveying YUV 4:4:4 content through such codecs can provide the substantial benefit of enabling widespread near-term deployment of YUV 4:4:4 capabilities. Using widely available YUV 4:2:0 codecs with specialized, dedicated hardware can provide fast encoding/decoding with lower power consumption for YUV 4:4:4 video content.

The described approaches can be used to preserve chroma information for pictures of one chroma sampling format when encoding/decoding uses another chroma sampling format. Many examples described herein involve pre-processing and post-processing of pictures in a YUV 4:4:4 format, for encoding/decoding using a codec adapted for a YUV 4:2:0 format. Other examples described herein involve pre-processing and post-processing of pictures in a YUV 4:4:4 format for encoding/decoding using a codec adapted for a YUV 4:2:2 format. More generally, the described approaches can be used for other chroma sampling formats. For example, in addition to variations of YUV color spaces such as Y'UV, YIQ, Y'IQ, YDbDr, YCbCr, YCoCg, etc. in sampling ratios such as 4:4:4, 4:2:2, 4:2:0, and 4:1:1, the described approaches can be used for color spaces such as RGB, GBR, etc. in sampling ratios such as 4:4:4, 4:2:2, 4:2:0, 4:1:1, etc. as the chroma sampling formats.

Additional innovative aspects of pre-processing and post-processing for higher-resolution chroma sampling formats are also described. The described techniques may be applied to applications other than video coding/decoding, such as burst-mode still-image coding, medical scan content coding, multispectral imagery content coding, etc. Although operations described herein are in places described as being performed by pre-processor (before a video encoder) or post-processor (after a video decoder), in many cases the operations can alternatively be performed by another type of media processing tool.

Some of the innovations described herein are illustrated with reference to syntax elements and operations specific to the H.264 standard or H.265 standard. The innovations described herein can also be implemented for other standards or formats.

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, any of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a graphics processing unit ("GPU") (115). In general, the GPU (115) is any specialized circuit, different from the CPU (110), that accelerates creation and/or manipulation of image data in a graphics pipeline. The GPU (115) can be implemented as part of a dedicated graphics card (video card), as part of a motherboard, as part of a system on a chip ("SoC"), or in some other way (even on the same die as the CPU (110)).

The tangible memory (120, 125) may be volatile memory (e.g., registers, cache, RAM), non-volatile memory (e.g., ROM, EEPROM, flash memory, etc.), or some combination of the two, accessible by the processing unit(s). In FIG. 1, the memory (120) is CPU memory, accessible to the CPU (110), and the memory (125) is GPU memory, accessible to the GPU (115). Depending on architecture (e.g., whether the GPU (115) is part of a video card, motherboard, or SoC), the CPU memory can be completely separate from the GPU memory, or the CPU memory and GPU memory can, at least in part, be shared memory or drawn from the same source (e.g., RAM). The memory (120, 125) stores software (180) implementing one or more innovations for selective upsampling and/or refresh of chroma sample values, in the form of computer-executable instructions suitable for execution by the processing unit(s). In some example implementations, the computer-executable instructions that implement the innovation(s) for selective upsampling and/or refresh of chroma sample values are one or more shader routines, executable on multiple processing cores of a GPU to perform operations in parallel for different areas of a picture. For example, one set of shader routines is executable by a GPU for pre-processing operations (e.g., chroma sub-sampling), and another set of shader routines is executable by a GPU for post-processing operations (e.g., chroma upsampling, refresh). Alternatively, the computer-executable instructions, which implement the innovation(s) for selective upsampling and/or refresh of chroma sample values, are executable on a general-purpose CPU.

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system ("OS") software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) can store instructions for the software (180) implementing one or more innovations for selective upsampling and/or refresh of chroma sample values.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a display, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine" and "perform" to describe computer operations in a computer system. These terms denote operations performed by a computer, and should not be confused with acts performed by a human being. The actual computer operations corresponding to these terms vary depending on implementation.

II. Example Network Environments.

Figure 2A:
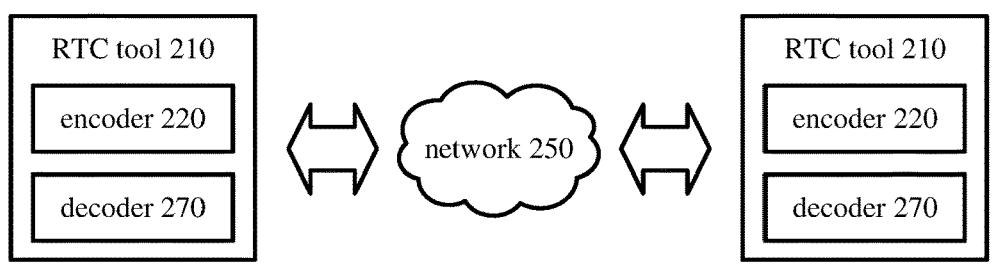
FIGS. 2a and 2b are diagrams illustrating example network environments in which some described embodiments can be implemented.
Figure 2B:
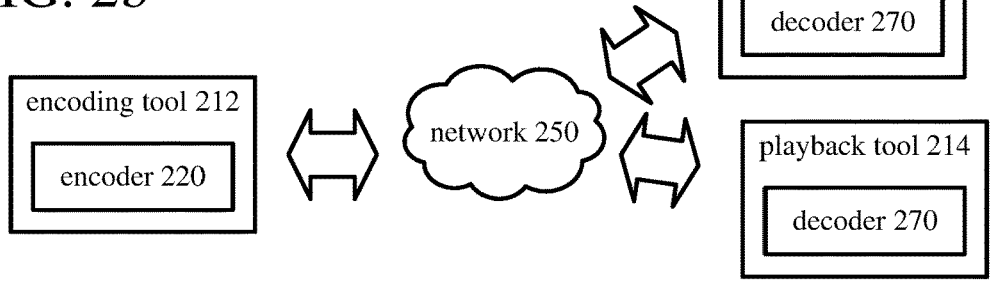

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with an extension or variation of the H.265/HEVC standard, SMPTE 421M standard, H.264/AVC, another standard, or a proprietary format such as VP8 or VP9, with a corresponding decoder (270) accepting encoded data from the encoder (220). The bidirectional communication can be part of a video conference, video telephone call, or other two-party or multi-party communication scenario. Although the network environment (201) in FIG. 2a includes two RTC tools (210), the network environment (201) can instead include three or more RTC tools (210) that participate in multi-party communication.

Figure 3:
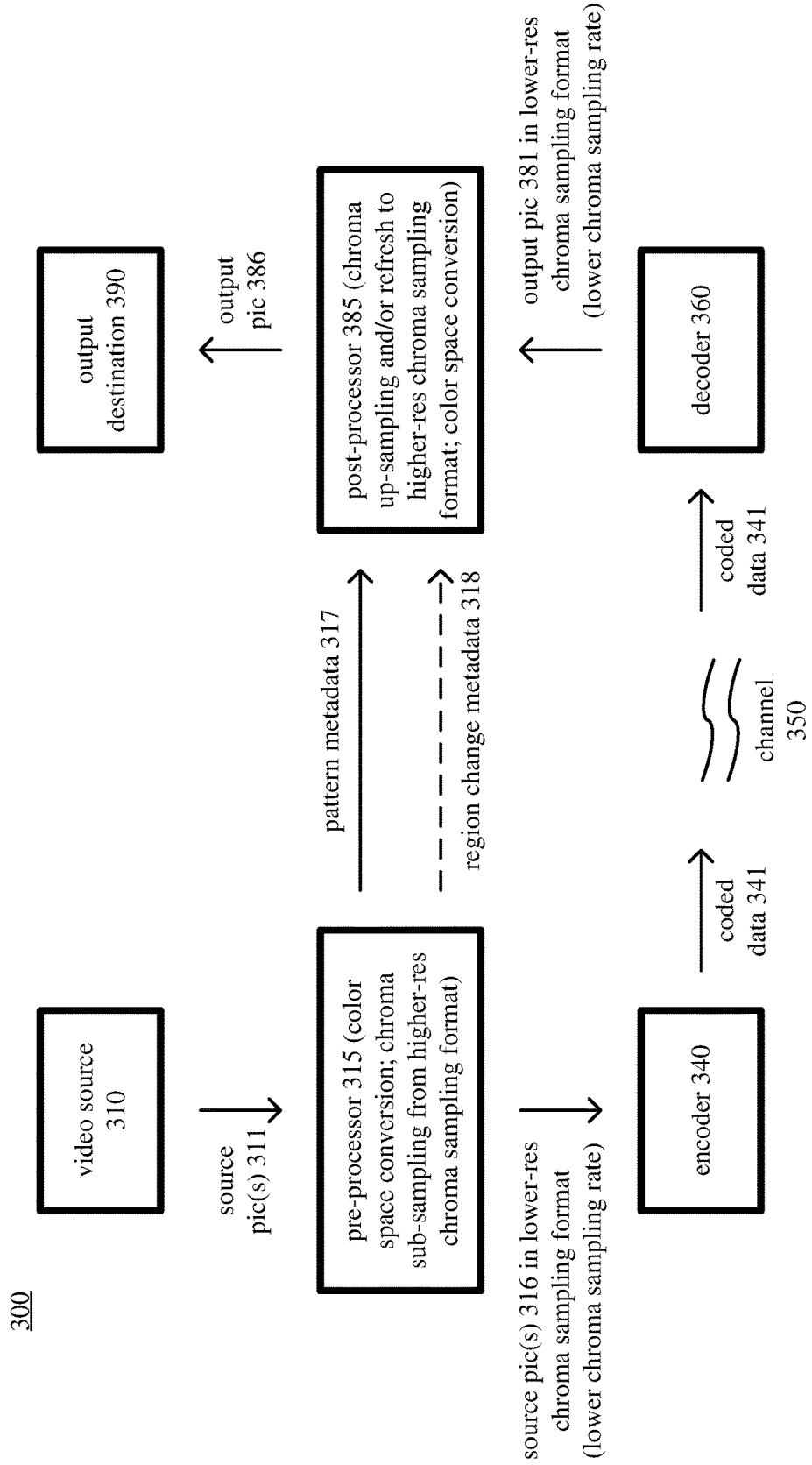
FIG. 3 is a diagram illustrating an example system with pre-processing and post-processing of chroma sample values, in conjunction with which some described embodiments can be implemented.
Figure 4:
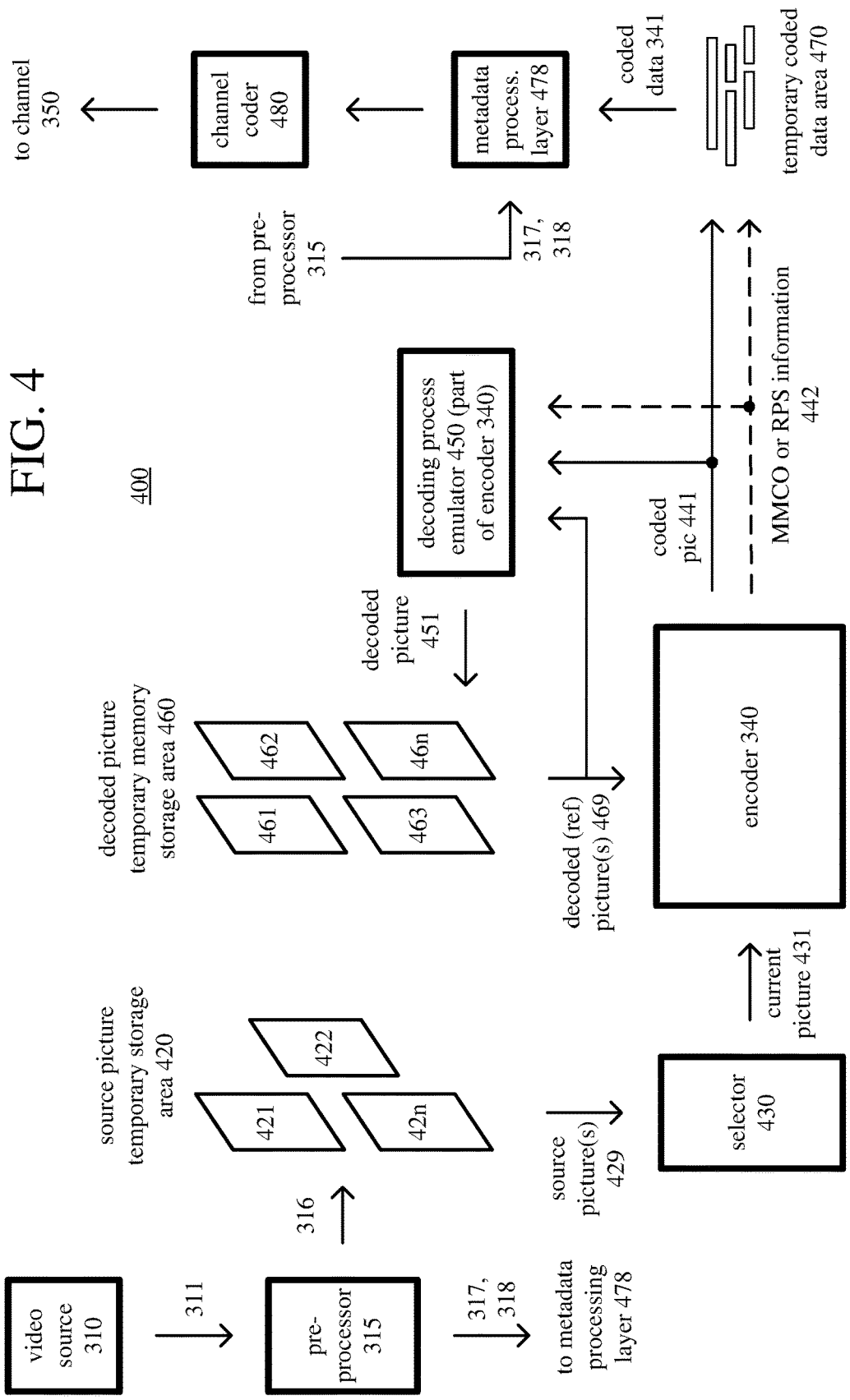
FIG. 4 is a diagram illustrating an example video encoder system.
Figure 6:
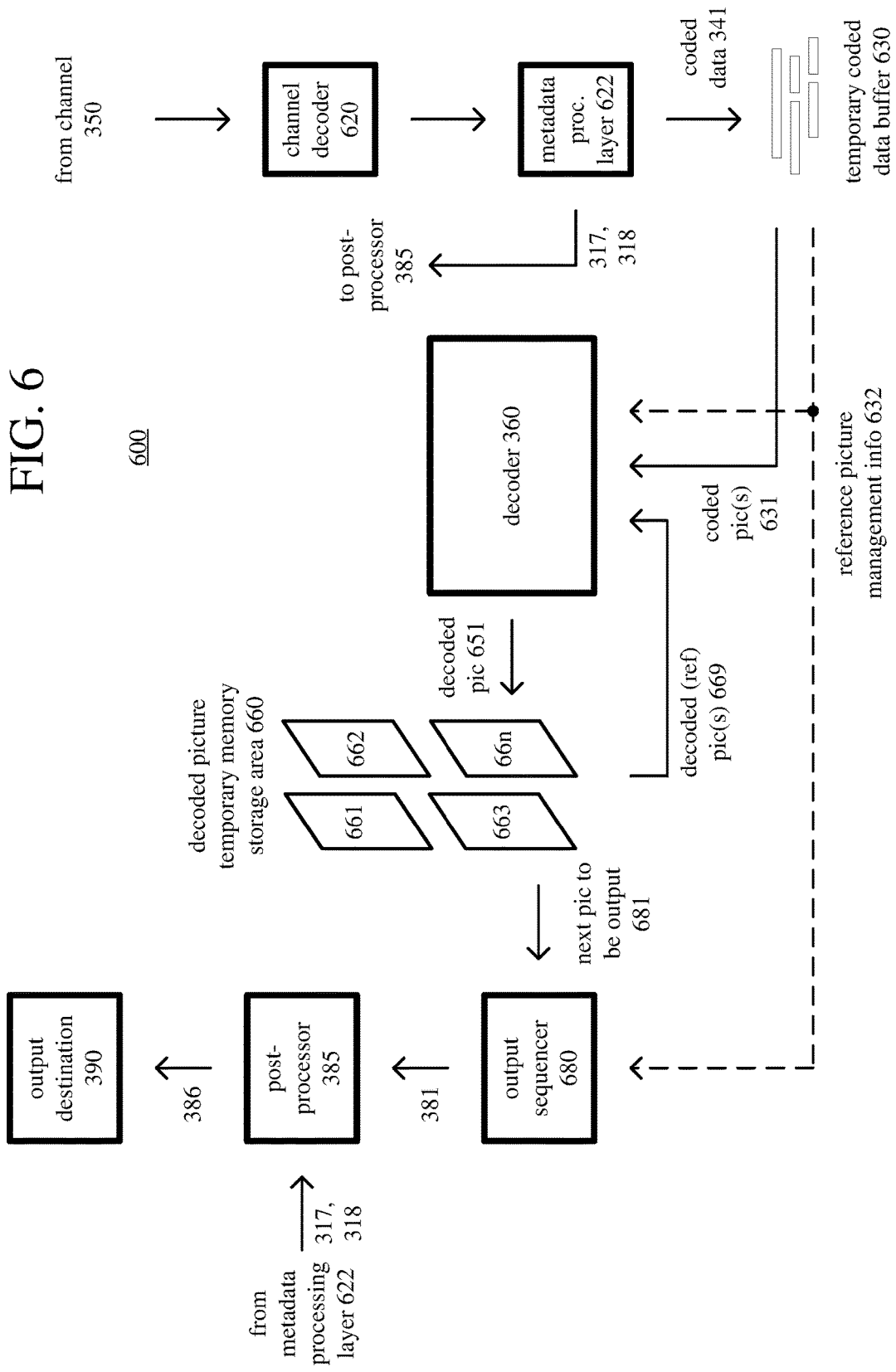
FIG. 6 is a diagram illustrating an example video decoder system.

An RTC tool (210) manages encoding by an encoder (220) and also manages decoding by a decoder (270). The RTC tool (210) includes a pre-processor (315) as shown in FIG. 3, or other pre-processor, for chroma sub-sampling operations. FIG. 4 shows an example video encoder system (400) that can be included in the RTC tool (210). Alternatively, the RTC tool (210) uses another encoder system. The RTC tool (210) also includes post-processor (385) as shown in FIG. 3, or other post-processor, for chroma upsampling and/or refresh operations. FIG. 6 shows an example video decoder system (600) that can be included in the RTC tool (210). Alternatively, the RTC tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or sharing, wireless screen casting according to the Miracast standard or another standard or format, cloud computing or gaming, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

The encoding tool (212) can include server-side controller logic for managing connections with one or more playback tools (214). The encoding tool (212) includes a pre-processor (315) as shown in FIG. 3, or other pre-processor, for chroma sub-sampling operations. FIG. 4 shows an example video encoder system (400) that can be included in the encoding tool (212). Alternatively, the encoding tool (212) uses another encoder system. A playback tool (214) can include client-side controller logic for managing connections with the encoding tool (212). The playback tool (214) also includes post-processor (385) as shown in FIG. 3, or other post-processor, for chroma upsampling and/or refresh operations. FIG. 6 shows an example video decoder system (600) that can be included in the playback tool (214). Alternatively, the playback tool (214) uses another decoder system.

III. Example Pre-Processing/Post-Processing Systems.

FIG. 3 shows an example system (300) with pre-processing and post-processing of chroma sample values. At the encoder side, the system (300) includes a video source (310), a pre-processor (315), and an encoder (340). At the decoder side, the system includes a decoder (360), post-processor (385), and output destination (390).

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

The pre-processor (315) performs pre-processing operations on source pictures (311) before encoding. The pre-processing operations can include color space conversion and resampling processing (e.g., to reduce the spatial resolution of chroma components) for encoding. Color space conversion and resampling processing can be performed separately or together. For the sake of clarity, the operations are described separately.

In general, a pixel is the set of one or more collocated sample values for a location in a picture, which may be arranged in different ways for different chroma sampling formats. Typically, before encoding, sample values of video are converted from a capture format (e.g., an RGB format) to a color space such as a YUV color space. In a YUV color space, sample values of a luma (Y) component represent brightness or intensity values, and sample values of chroma (U, V) components represent chroma values. The precise definitions of the chroma values (and conversion operations to/from a YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. As used herein, the term YUV also encompasses color spaces such as ICtCp, for which sample values of an intensity (I) component and color (Ct, Cp) components correspond to luma component and chroma components, respectively. The component signal measures that are used may be adjusted through the application of a non-linear transfer characteristics function (generally known as "gamma pre-compensation" and often denoted by the use of a prime symbol, although the prime symbol is often omitted for typographical convenience). Or, the component signal measures may be in a domain that has a linear relationship with light amplitude. The luma and chroma component signals may be well aligned with the perception of brightness and color for the human visual system, or the luma and chroma component signals may somewhat deviate from such measures (e.g., as in the YCoCg variation, in which formulas are applied that simplify the computation of the color component values). Examples of YUV formats as described herein include those described in the international standards known as ITU-R BT.601, ITU-R BT.709, and ITU-R BT.2020. Examples of chroma sample types are shown in Figure E-1 of the H.264/AVC standard.

After color space conversion from the capture format (e.g., an RGB format), the source pictures (311) are in a higher-resolution chroma sampling format such as a 4:4:4 format. Chroma sample values may be sub-sampled to a lower chroma sampling rate (e.g., for a YUV 4:2:0 format) in order to reduce the spatial resolution of chroma sample values. A YUV 4:2:0 format is a format that sub-samples chroma information compared to a YUV 4:4:4 format, so that chroma resolution is half of luma resolution both horizontally and vertically. A YUV 4:2:2 format is a format that sub-samples chroma information compared to a YUV 4:4:4 format, so that chroma resolution is half that of luma resolution horizontally, but the same as luma resolution vertically. A YUV 4:1:1 format is a format that sub-samples chroma information compared to a YUV 4:4:4 format, so that chroma resolution is one quarter that of luma resolution horizontally, but the same as luma resolution vertically.

When performing chroma sub-sampling, the pre-processor (315) retains some chroma sample values of the higher-resolution chroma sampling format, which has the higher chroma sampling rate, and discards other chroma sample values of the higher-resolution chroma sampling format. When selecting the positions for which chroma sample values are retained, the pre-processor (315) follows a refresh pattern. The refresh pattern changes positions, e.g., from picture-to-picture, so as to facilitate recovery of stationary content at the higher-resolution chroma sampling format. Examples of refresh patterns are described below.

The pre-processor (315) outputs pattern metadata (317). The pattern metadata (317) indicates, for the refresh pattern as applied for a picture, which of the chroma sample values of the picture in the higher-resolution chroma sampling format have been retained for that picture in the lower-resolution chroma sampling format. At the decoder side, the post-processor (385) can use the pattern metadata (317) to determine positions (in the higher-resolution chroma sampling format) to be refreshed using reconstructed chroma sample values from the picture in the lower-resolution chroma sampling format. The pattern metadata (317) can be signaled as part of a supplemental enhancement information ("SEI") message, as part of a field of a container, or in some other way. The pattern metadata (317) can be signaled per picture (on a picture-by-picture basis) or signaled at some other frequency.

Alternatively, the pre-processor (315) and post-processor (385) follow an implied pattern, without signaling of pattern metadata (317). For example, the pre-processor (315) and post-processor (385) restart the refresh pattern at a pre-defined event (e.g., first picture of sequence, first picture after scene change, a full replacement of chroma sample values of a picture with upsampling, a restart event signaled by the pre-processor (315) to the post-processor (385)), then follow the same pattern after that. So long as picture count values are accurate and available (or if not available, so long as pictures are not dropped), the pre-processor (315) and post-processor (385) can remain in synchronization with respect to positions for chroma sub-sampling and refresh operations.

In some implementations, the pre-processor (315) also determines and outputs region change metadata (318), which indicates whether regions of a current picture are stationary or non-stationary. To determine the region change metadata (318), for each of the regions of the current picture, the pre-processor (315) determines whether the region is stationary or non-stationary relative to a previous picture in display order (typically, the immediately previous picture). For example, the pre-processor (315) determines whether or not a region is stationary based on information from an OS component indicating which of the regions has changed (is "dirty") relative to the previous picture. Or, the pre-processor (315) determines whether or not a region is stationary based on results of comparing chroma sample values in the region with corresponding chroma sample values of a co-located region in the previous picture. Or, the pre-processor (315) determines whether or not a region is stationary in some other way. In any case, at the decoder side, the post-processor (385) can use the region change metadata (318) to determine whether to perform upsampling operations or refresh operations on a region-by-region basis, as explained below.

The region change metadata (318) can be signaled as part of a SEI message, as part of a field of a container, or in some other way. The region change metadata (318) can be signaled per picture (on a picture-by-picture basis) or signaled at some other frequency.

The region change metadata (318) can be a single bit per region (e.g., 2×2 region, 8×8 region, 16×16 region, or some other size of region). The pre-processor (315) can encode such region change metadata (318). For example, the region change metadata (318) can be encoded using context-adaptive binary arithmetic coding ("CABAC"), bit plane coding, or some other type of entropy coding. Or, the region change metadata (318) can be represented in some other way (e.g., coordinates of rectangles for non-stationary regions).

In other implementations, the pre-processor (315) does not determine or output region change metadata (318). Instead, the post-processor (385) independently determines whether the respective regions of a current picture are stationary or non-stationary, as described below.

The encoder (340) encodes the source pictures (316) in the lower-resolution chroma sampling format having the lower chroma sampling rate. Example encoders are described below with reference to FIGS. 4, 5a, and 5b. The encoder (340) outputs coded data (341) over a channel (350), which represents storage, a communications connection, or another channel for the output.

The decoder (360) receives the encoded data (341) and decodes the pictures (316) of the lower-resolution chroma sampling format. Example decoders are described below with reference to FIGS. 6 and 7. The decoder outputs reconstructed pictures (381) of the lower-resolution chroma sampling format.

The post-processor (385) performs post-processing operations on the output reconstructed pictures (381) after decoding. The post-processing operations can include resampling processing (e.g., to increase the spatial resolution of chroma components) after decoding as well as color space conversion. Color space conversion and resampling processing can be performed separately or together. For the sake of clarity, the operations are described separately.

After decoding, the reconstructed output pictures (381) are in a lower-resolution chroma sampling format such as a 4:2:0 format. The post-processor (385) restores the chroma sample values to a higher-resolution chroma sampling format (such as a 4:4:4 format) using chroma upsampling operations and/or refresh operations. When selecting the positions for which chroma sample values are refreshed, the post-processor (385) follows a refresh pattern. The refresh pattern changes positions, e.g., from picture-to-picture, so as to facilitate recovery of stationary content at the higher-resolution chroma sampling format. Examples of refresh patterns are described below.

The post-processor (385) receives pattern metadata (317). The pattern metadata (317) indicates, for the refresh pattern as applied for a picture, which of the chroma sample values of the picture in the higher-resolution chroma sampling format have been retained for that picture in the lower-resolution chroma sampling format. The post-processor (385) can use the pattern metadata (317) to determine positions (in the higher-resolution chroma sampling format) to be refreshed using reconstructed chroma sample values from the picture in the lower-resolution chroma sampling format. The pattern metadata (317) can be received as part of a SEI message, as part of a field of a container, or in some other way. The pattern metadata (317) can be received per picture (on a picture-by-picture basis) or received at some other frequency.

Alternatively, the pre-processor (315) and post-processor (385) follow an implied pattern, without signaling of pattern metadata (317), as described above.

In some implementations, the post-processor (385) also receives and uses region change metadata (318), which indicates whether regions of a current picture are stationary or non-stationary. Specifically, the post-processor (385) can use the region change metadata (318) to determine whether to perform upsampling operations or refresh operations on a region-by-region basis. For example, for a stationary region, the post-processor (385) refreshes chroma sample values at selected positions in the region using reconstructed chroma sample values from the picture in the lower-resolution chroma sampling format. For a non-stationary region, the post-processor (385) replaces chroma sample value in the region by upsampling reconstructed chroma sample values from the picture in the lower-resolution chroma sampling format. The upsampled chroma sample values can be filtered to mitigate discontinuities or artifacts (e.g., using a lowpass filter). The region change metadata (318) can be received as part of a SEI message, as part of a field of a container, or in some other way. The region change metadata (318) can be received per picture (on a picture-by-picture basis) or received at some other frequency. When the region change metadata (318) is encoded, the post-processor (385) decodes the region change metadata (318), to reverse entropy encoding applied by the pre-processor (315).

In other implementations, the post-processor (385) does not receive and use region change metadata (318). Instead, the post-processor (385) independently determines whether the respective regions of a current picture are stationary or non-stationary. For example, the post-processor (385) determines whether a region of the current picture is stationary or non-stationary based on results of comparing reconstructed luma sample values in the region with corresponding reconstructed luma sample values of a co-located region in a previous picture in display order (typically, the immediately previous picture). In making this determination, the post-processor (385) can account for the possibility of differences in luma sample values that are caused by reconstruction error in the encoding/decoding process. For example, the post-processor (385) determines a count of how many of the reconstructed luma sample values in the region have changed compared to the corresponding reconstructed luma sample values of the co-located region in the previous picture. Then, the post-processor (385) compares the count to a threshold, which depends on implementation (e.g., the threshold is one sample value, two sample values, or some other number of sample values). If the count satisfies (e.g., is below) the threshold, the region is deemed to be stationary. Otherwise, the region is deemed to be non-stationary. Alternatively, the post-processor (385) determines whether a region of the current picture is stationary or non-stationary in some other way (e.g., based on SAD or some other distortion measure for reconstructed luma sample values between the region of the current picture and co-located region, or based on motion hints provided by the decoder (360)).

The post-processor (385) can also perform color space conversion operations, returning pictures to an original color space (e.g., RGB). The post-processor (385) provides output pictures (386) to an output destination (390) (e.g., display).

IV. Example Video Encoder Systems.

FIG. 4 shows an example video encoder system (400) in conjunction with which some described embodiments may be implemented. The video encoder system (400) includes a video encoder (340), which is further detailed in FIGS. 5a and 5b. The video encoder system (400) encodes pictures in the lower-resolution chroma sampling format, which has a lower chroma sampling rate compared to input video.

The video encoder system (400) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The video encoder system (400) can be adapted for encoding of a particular type of content, such as screen capture content. The video encoder system (400) can be implemented as part of an operating system module, as part of an application library, as part of a standalone application, or using special-purpose hardware. Overall, the video encoder system (400) receives a sequence of source pictures (311) from a video source (310), performs color space conversion and chroma sub-sampling operations as pre-processing of the pictures (311), encodes the resulting pictures (316) in a lower-resolution chroma sampling format, and produces encoded data as output to a channel (350).

As described with reference to FIG. 3, the video source (310) produces source pictures (311), and the pre-processor (315) performs pre-processing operations on the source pictures (311) before encoding, producing source pictures (316) in the lower-resolution chroma sampling format, pattern metadata (317) and, in some implementations, region change metadata (318). Before the encoder (340), the encoder system (400) can include another pre-processor (not shown) that performs other pre-processing (e.g., filtering) before encoding.

An arriving source picture (316) (in the lower-resolution chroma sampling format) is stored in a source picture temporary memory storage area (420) that includes multiple picture buffer storage areas (421, 422, . . . , 42n). A picture buffer (421, 422, etc.) holds one source picture in the source picture storage area (420). After one or more of the source pictures (316) have been stored in picture buffers (421, 422, etc.), a picture selector (430) selects an individual source picture from the source picture storage area (420) to encode as the current picture (431). The order in which pictures are selected by the picture selector (430) for input to the video encoder (340) may differ from the order in which the pictures are produced by the video source (310), e.g., the encoding of some pictures may be delayed in order, so as to allow some later pictures to be encoded first and to thus facilitate temporally backward prediction. To the extent the pre-processing and post-processing of chroma sample values are outside the encoder (340) and decoder (360), the encoder (340) can use any structure for groups of pictures ("GOPs") during encoding, including GOP structures with bi-predictive ("B") content and remote prediction.

Figure 5A:
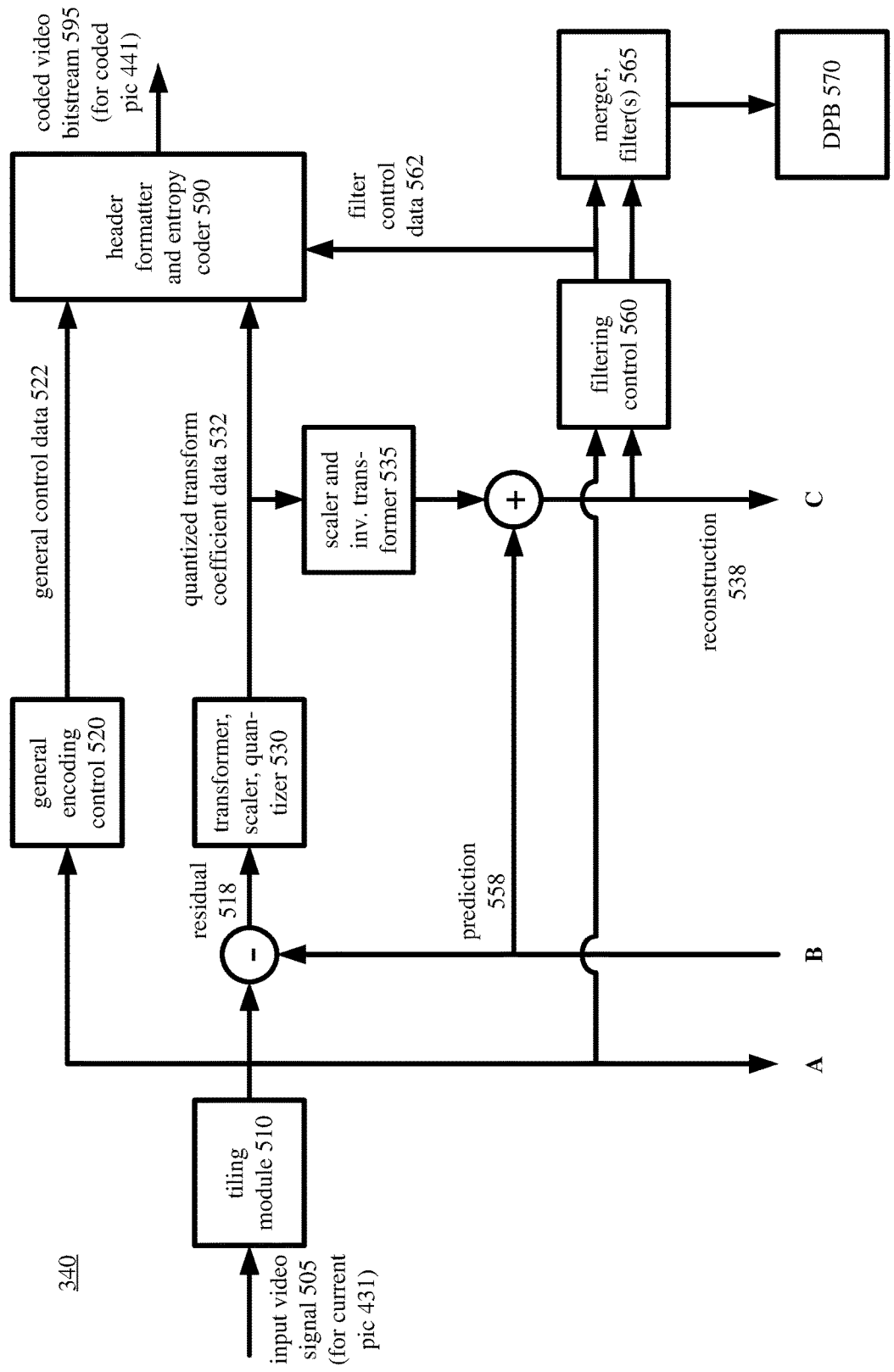
FIGS. 5a and 5b are diagrams illustrating an example video encoder, in conjunction with which some described embodiments can be implemented.
Figure 5B:
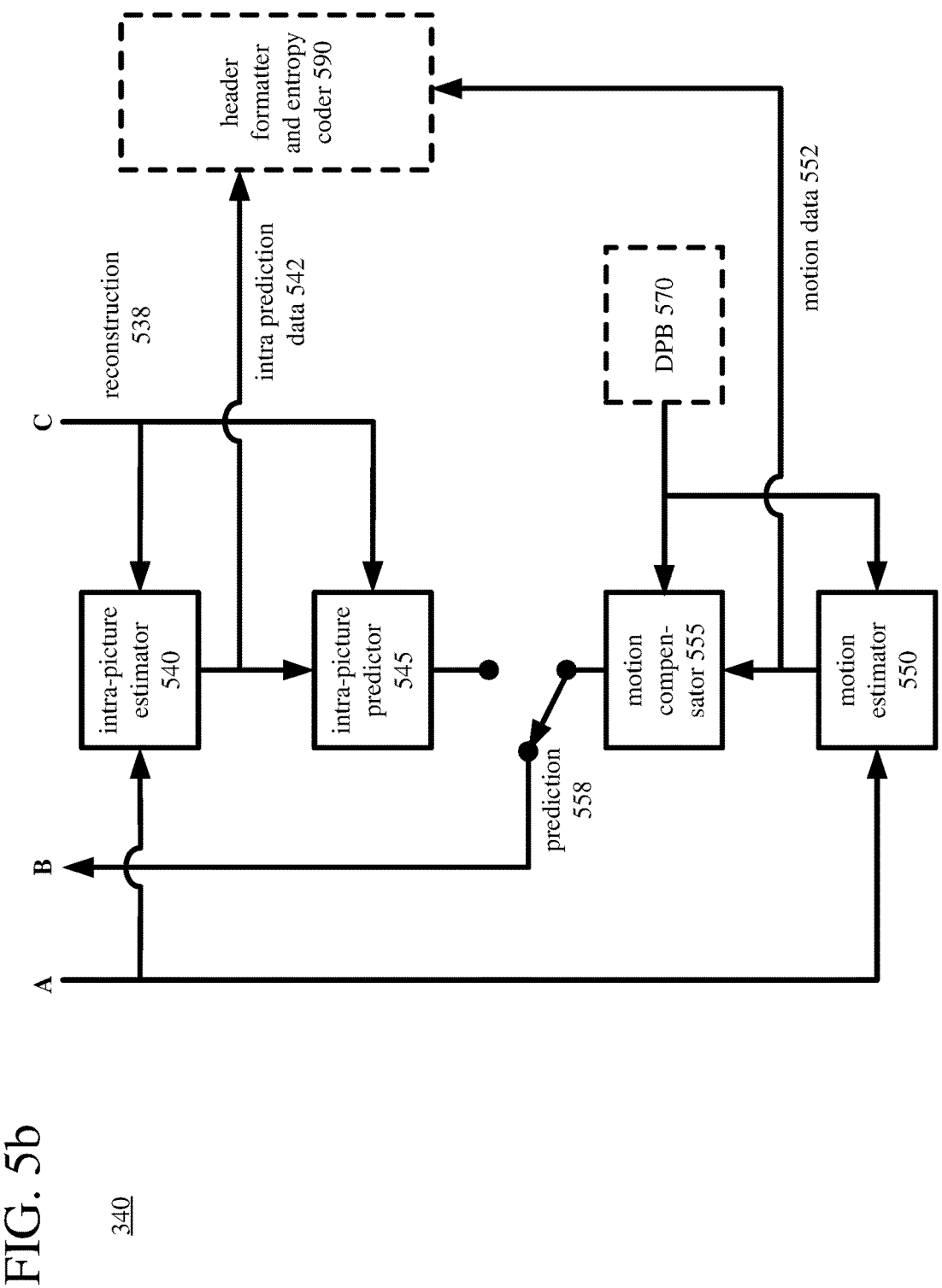

The video encoder (340) encodes the current picture (431) to produce a coded picture (441). As shown in FIGS. 5a and 5b, the video encoder (340) receives the current picture (431) as an input video signal (505) and produces encoded data for the coded picture (441) in a coded video bitstream (595) as output.

Generally, the video encoder (340) includes multiple encoding modules that perform encoding tasks such as splitting into tiles, intra-picture prediction estimation and prediction, motion estimation and compensation, frequency transforms, quantization, and entropy coding. Many of the components of the video encoder (340) are used for both intra-picture coding and inter-picture coding. The exact operations performed by the video encoder (340) can vary depending on compression format and can also vary depending on encoder-optional implementation decisions.

As shown in FIG. 5a, the video encoder (340) can include a tiling module (510). With the tiling module (510), the video encoder (340) can split a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further split into blocks or other sets of sample values for purposes of encoding and decoding. Blocks may be further sub-divided at different stages, e.g., at the prediction, frequency transform and/or entropy encoding stages. For example, a picture can be divided into 64×64 blocks, 32×32 blocks, or 16×16 blocks, which can in turn be divided into smaller blocks of sample values for coding and decoding.

For syntax according to the H.264/AVC standard, the video encoder (340) can split a picture into one or more slices of the same size or different sizes. The video encoder (340) splits the content of a picture (or slice) into 16×16 macroblocks. A macroblock ("MB") includes luma sample values organized as four 8×8 luma blocks and corresponding chroma sample values organized as 8×8 chroma blocks. Generally, a MB has a prediction mode such as inter or intra. A MB includes one or more prediction units (e.g., 8×8 blocks, 4×4 blocks, which may be called partitions for inter-picture prediction) for purposes of signaling of prediction information (such as prediction mode details, MV information, etc.) and/or prediction processing. A MB also has one or more residual data units for purposes of residual coding/decoding.

For syntax according to the H.265/HEVC standard, the video encoder (340) splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the video encoder. A luma CTB can contain, for example, 64×64, 32×32, or 16×16 luma sample values. A CTU includes one or more coding units. A coding unit ("CU") has a luma coding block ("CB") and two corresponding chroma CBs. For example, according to quadtree syntax, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs according to quadtree syntax.

In H.265/HEVC implementations, a CU has a prediction mode such as inter or intra. A CU typically includes one or more prediction units for purposes of signaling of prediction information (such as prediction mode details, displacement values, etc.) and/or prediction processing. A prediction unit ("PU") has a luma prediction block ("PB") and two chroma PBs. For an inter-picture-predicted CU, the CU can have one, two, or four PUs, where splitting into four PUs is allowed only if the CU has the smallest allowable size.

In H.265/HEVC implementations, a CU also typically has one or more transform units for purposes of residual coding/decoding, where a transform unit ("TU") has a luma transform block ("TB") and two chroma TBs. A CU may contain a single TU (equal in size to the CU) or multiple TUs. According to quadtree syntax, a TU can be split into four smaller TUs, which may in turn be split into smaller TUs according to quadtree syntax. The video encoder decides how to split video into CTUs (CTBs), CUs (CBs), PUs (PBs) and TUs (TBs).

As used herein, the term "block" can indicate a MB, residual data unit, CTB, CB, PB or TB, or some other set of sample values, depending on context. The term "unit" can indicate a MB, CTU, CU, PU, TU or some other set of blocks, or it can indicate a single block, depending on context.

As shown in FIG. 4a, the video encoder (340) includes a general encoding control (520), which receives the input video signal (505) for the current picture (431) as well as feedback (not shown) from various modules of the video encoder (340). Overall, the general encoding control (520) provides control signals (not shown) to other modules, such as the tiling module (510), transformer/scaler/quantizer (530), scaler/inverse transformer (535), intra-picture prediction estimator (540), motion estimator (550), and intra/inter switch, to set and change coding parameters during encoding. The general encoding control (520) can evaluate intermediate results during encoding, typically considering bit rate costs and/or distortion costs for different options. In particular, the general encoding control (520) decides whether to use intra-picture prediction or inter-picture prediction for the units of the current picture (431). If inter-picture prediction is used for a unit, in conjunction with the motion estimator (550), the general encoding control (520) decides which reference picture(s) to use for the inter-picture prediction. The general encoding control (520) determines which reference pictures to retain in a decoded picture buffer ("DPB") or other buffer. The general encoding control (520) produces general control data (522) that indicates decisions made during encoding, so that a corresponding decoder can make consistent decisions. The general control data (522) is provided to the header formatter/entropy coder (590).

With reference to FIG. 5b, if a unit of the current picture (431) is predicted using inter-picture prediction, a motion estimator (550) estimates the motion of blocks of sample values of the unit with respect to one or more reference pictures. The current picture (431) can be entirely or partially coded using inter-picture prediction. When multiple reference pictures are used, the multiple reference pictures can be from different temporal directions or the same temporal direction. The motion estimator (550) evaluates candidate MVs. The motion estimator (550) can evaluate different partition patterns for motion compensation for partitions of a given unit of the current picture (431) (e.g., 2N×2N, 2N×N, N×2N, or N×N partitions for PUs of a CU in the H.265/HEVC standard). The DPB (570), which is an example of decoded picture temporary memory storage area (460) as shown in FIG. 4, buffers one or more reconstructed previously coded pictures for use as reference pictures.

The motion estimator (550) produces motion data (552) as side information. In particular, the motion data (552) can include information that indicates whether contextual motion mode (e.g., merge mode in the H.265/HEVC standard) is used and, if so, the candidate MV for contextual motion mode (e.g., merge mode index value in the H.265/HEVC standard). More generally, the motion data (552) can include MV data and reference picture selection data. The motion data (552) is provided to the header formatter/entropy coder (590) as well as the motion compensator (555). The motion compensator (555) applies MV(s) for a block to the reconstructed reference picture(s) from the DPB (570) or other buffer. For the block, the motion compensator (555) produces a motion-compensated prediction, which is an area of sample values in the reference picture(s) that are used to generate motion-compensated prediction values for the block.

With reference to FIG. 5b, if a unit of the current picture (431) is predicted using intra-picture prediction, an intra-picture prediction estimator (540) determines how to perform intra-picture prediction for blocks of sample values of the unit. The current picture (431) can be entirely or partially coded using intra-picture prediction. Using values of a reconstruction (538) of the current picture (431), for intra spatial prediction, the intra-picture prediction estimator (540) determines how to spatially predict sample values of a block of the current picture (431) from previously reconstructed sample values of the current picture (431), e.g., selecting an intra-picture prediction mode. Or, for intra block copy mode, the intra-picture prediction estimator (540) determines how to predict sample values of a block of the current picture (431) using an offset (sometimes called a block vector) that indicates a previously encoded/decoded portion of the current picture (431). Intra block copy mode can be implemented as a special case of inter-picture prediction in which the reference picture is the current picture (431), and only previously encoded/decoded sample values of the current picture (431) can be used for prediction. As side information, the intra-picture prediction estimator (540) produces intra prediction data (542), such as the prediction mode/direction used. The intra prediction data (542) is provided to the header formatter/entropy coder (590) as well as the intra-picture predictor (545).

According to the intra prediction data (542), the intra-picture predictor (545) spatially predicts sample values of a block of the current picture (431) from previously reconstructed sample values of the current picture (431), producing intra-picture predicted sample values for the block. Or, the intra-picture predictor (545) predicts sample values of the block using intra block copy prediction, using an offset (block vector) for the block.

As shown in FIG. 5b, the intra/inter switch selects whether the predictions (558) for a given unit will be motion-compensated predictions or intra-picture predictions. Intra/inter switch decisions for units of the current picture (431) can be made using various criteria.

The video encoder (340) can determine whether or not to encode and transmit the differences (if any) between a block's prediction values (intra or inter) and corresponding original values. The differences (if any) between a block of the prediction (558) and a corresponding part of the original current picture (431) of the input video signal (505) provide values of the residual (518). If encoded/transmitted, the values of the residual (518) are encoded using a frequency transform (if the frequency transform is not skipped), quantization, and entropy encoding. In some cases, no residual is calculated for a unit. Instead, residual coding is skipped, and the predicted sample values are used as the reconstructed sample values.

With reference to FIG. 5a, when values of the residual (518) are encoded, in the transformer/scaler/quantizer (530), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of values of the residual (518) (or sample value data if the prediction (558) is null), producing blocks of frequency transform coefficients. The transformer/scaler/quantizer (530) can apply a transform with variable block sizes. In this case, the transformer/scaler/quantizer (530) can determine which block sizes of transforms to use for the residual values for a current block. For example, in H.265/HEVC implementations, the transformer/scaler/quantizer (530) can split a TU by quadtree decomposition into four smaller TUs, each of which may in turn be split into four smaller TUs, down to a minimum TU size. In H.265/HEVC implementations, the frequency transform can be skipped. In this case, values of the residual (518) can be quantized and entropy coded.

With reference to FIG. 5a, in the transformer/scaler/quantizer (530), a scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis, or other basis. The quantization step size can depend on a quantization parameter ("QP"), whose value is set for a picture, tile, slice, and/or other portion of video. The quantized transform coefficient data (532) is provided to the header formatter/entropy coder (590). If the frequency transform is skipped, the scaler/quantizer can scale and quantize the blocks of prediction residual data (or sample value data if the prediction (558) is null), producing quantized values that are provided to the header formatter/entropy coder (590).

As shown in FIGS. 5a and 5b, the header formatter/entropy coder (590) formats and/or entropy codes the general control data (522), quantized transform coefficient data (532), intra prediction data (542), motion data (552), and filter control data (562). The entropy coder of the video encoder (340) compresses quantized transform coefficient values as well as certain side information (e.g., MV information, QP values, mode decisions, parameter choices, filter parameters). Typical entropy coding techniques include Exponential-Golomb coding, Golomb-Rice coding, CABAC, differential coding, Huffman coding, run length coding, variable-length-to-variable-length ("V2V") coding, variable-length-to-fixed-length ("V2F") coding, Lempel-Ziv ("LZ") coding, dictionary coding, and combinations of the above. The entropy coder can use different coding techniques for different kinds of information, can apply multiple techniques in combination (e.g., by applying Exponential-Golomb coding or Golomb-Rice coding as binarization for CABAC), and can choose from among multiple code tables within a particular coding technique.

The video encoder (340) produces encoded data for the coded picture (441) in an elementary bitstream, such as the coded video bitstream (595) shown in FIG. 5a. In FIG. 5a, the header formatter/entropy coder (590) provides the encoded data in the coded video bitstream (595). The syntax of the elementary bitstream is typically defined in a codec standard or format. For example, the format of the coded video bitstream (595) can be an extension or variation of a Windows Media Video format, SMPTE 421M format, MPEG-x format (e.g., MPEG-1, MPEG-2, or MPEG-4), H.26x format (e.g., H.261, H.262, H.263, H.264, H.265), VPx format, or another format. After output from the video encoder (340), the elementary bitstream is typically packetized or organized in a container format, as explained below.

The encoded data in the elementary bitstream includes syntax elements organized as syntax structures. In general, a syntax element can be any element of data, and a syntax structure is zero or more syntax elements in the elementary bitstream in a specified order.

As shown in FIG. 4, the video encoder (340) also produces memory management control operation ("MMCO") signals (442) or reference picture set ("RPS") information. The RPS is the set of pictures that may be used for reference in motion compensation for a current picture or any subsequent picture. If the current picture (431) is not the first picture that has been encoded, when performing its encoding process, the video encoder (340) may use one or more previously encoded/decoded pictures (469) that have been stored in a decoded picture temporary memory storage area (460). Such stored decoded pictures (469) are used as reference pictures for inter-picture prediction of the content of the current picture (431). The MMCO/RPS information (442) indicates to a video decoder which reconstructed pictures may be used as reference pictures, and hence should be stored in a picture storage area such as the DPB (570) in FIGS. 5a and 5b.

The decoding process emulator (450) implements some of the functionality of a video decoder, for example, decoding tasks to reconstruct reference pictures. In a manner consistent with the MMCO/RPS information (442), the decoding process emulator (450) determines whether a given coded picture (441) needs to be reconstructed and stored for use as a reference picture in inter-picture prediction of subsequent pictures to be encoded. If a coded picture (441) needs to be stored (and possibly modified), the decoding process emulator (450) models the decoding process that would be conducted by a video decoder that receives the coded picture (441) and produces a corresponding decoded picture (451).

The decoding process emulator (450) may be implemented as part of the video encoder (340). For example, the decoding process emulator (450) includes certain modules and logic as shown in FIGS. 5a and 5b. During reconstruction of the current picture (431), when values of the residual (518) have been encoded/signaled, reconstructed residual values are combined with the prediction (558) to produce an approximate or exact reconstruction (538) of the original content from the video signal (505) for the current picture (431). (In lossy compression, some information is lost from the video signal (505).)

With reference to FIG. 5a, to reconstruct residual values, in the scaler/inverse transformer (535), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the video encoder (340) combines reconstructed residual values with values of the prediction (558) (e.g., motion-compensated prediction values, intra-picture prediction values) to form the reconstruction (538). When residual values have not been encoded/signaled, the video encoder (340) uses the values of the prediction (558) as the reconstruction (538).

With reference to FIGS. 5a and 5b, for intra-picture prediction, the values of the reconstruction (538) can be fed back to the intra-picture prediction estimator (540) and intra-picture predictor (545). The values of the reconstruction (538) can be used for motion-compensated prediction of subsequent pictures. The values of the reconstruction (538) can be further filtered. A filtering control (560) determines how to perform deblock filtering and sample adaptive offset ("SAO") filtering on values of the reconstruction (538), for the current picture (431). The filtering control (560) produces filter control data (562), which is provided to the header formatter/entropy coder (590) and merger/filter(s) (565).

In the merger/filter(s) (565), the video encoder (340) merges content from different tiles into a reconstructed version of the current picture. The video encoder (340) selectively performs deblock filtering and SAO filtering according to the filter control data (562) and rules for filter adaptation, so as to adaptively smooth discontinuities across boundaries in the current picture (431). Other filtering (such as de-ringing filtering or adaptive loop filtering ("ALF"); not shown) can alternatively or additionally be applied. Tile boundaries can be selectively filtered or not filtered at all, depending on settings of the video encoder (340), and the video encoder (340) may provide syntax elements within the coded bitstream to indicate whether or not such filtering was applied.

In FIGS. 5a and 5b, the DPB (570) buffers the reconstructed current picture, after filtering by the filter(s) (565), for use in subsequent motion-compensated prediction. More generally, as shown in FIG. 4, the decoded picture temporary memory storage area (460) includes multiple picture buffer storage areas (461, 462, ..., 46n). In a manner consistent with the MMCO/RPS information (442), the decoding process emulator (450) manages the contents of the storage area (460) in order to identify any picture buffers (461, 462, etc.) with pictures that are no longer needed by the video encoder (340) for use as reference pictures. After modeling the decoding process, the decoding process emulator (450) stores a newly decoded picture (451) in a picture buffer (461, 462, etc.) that has been identified in this manner As shown in FIG. 4, the coded picture (441) and MMCO/RPS information (442) are buffered in a temporary coded data area (470). The coded data that is aggregated in the coded data area (470) contains, as part of the syntax of the elementary bitstream, encoded data for one or more pictures. The coded data that is aggregated in the coded data area (470) can also include media metadata relating to the coded video data (e.g., as one or more parameters in one or more SEI messages or video usability information ("VUI") messages).

The metadata processing layer (478) receives the pattern metadata (317) and/or region change metadata (318) from the pre-processor (315) and organizes it for output. The metadata processing layer (478) can also process the coded data (341) from the temporary coded data area (470). Specifically, the metadata processing layer (478) can packetize and/or multiplex the aggregated coded data (341) for transmission or storage as a media stream or file. Or, more generally, the metadata processing layer (478) can implement one or more media system multiplexing protocols or transport protocols.

The channel coder (480) provides output to the channel (350), which represents storage, a communications connection, or another channel for the output. The channel coder (480) or channel (350) may include elements (not shown), e.g., for forward-error correction ("FEC") encoding and analog signal modulation.

Depending on implementation and the type of compression desired, modules of the video encoder system (400) and/or video encoder (340) can be added, omitted, split into multiple modules, combined with other modules, and/or replaced with like modules. In alternative embodiments, encoder systems or encoders with different modules and/or other configurations of modules perform one or more of the described techniques. Specific embodiments of encoder systems typically use a variation or supplemented version of the video encoder system (400). Specific embodiments of video encoders typically use a variation or supplemented version of the video encoder (340). The relationships shown between modules within the video encoder system (400) and video encoder (340) indicate general flows of information in the video encoder system (400) and video encoder (340), respectively; other relationships are not shown for the sake of simplicity. In general, a given module of the video encoder system (400) or video encoder (340) can be implemented by software executable on a CPU, by software controlling special-purpose hardware (e.g., graphics hardware for video acceleration), or by special-purpose hardware (e.g., in an ASIC).

V. Example Video Decoder Systems.

FIG. 6 is a block diagram of an example video decoder system (600) in conjunction with which some described embodiments may be implemented. The video decoder system (600) includes a video decoder (360), which is further detailed in FIG. 7. The video decoder system (600) decodes pictures in the lower-resolution chroma sampling format, which has a lower chroma sampling rate compared to output video.

The video decoder system (600) can be a general-purpose decoding tool capable of operating in any of multiple decoding modes such as a low-latency decoding mode for real-time communication, a transcoding mode, and a higher-latency decoding mode for media playback from a file or stream, or it can be a special-purpose decoding tool adapted for one such decoding mode. The video decoder system (600) can be implemented as part of an operating system module, as part of an application library, as part of a standalone application or using special-purpose hardware. Overall, the video decoder system (600) receives coded data from a channel (350), decodes pictures in a lower-resolution chroma sampling format, performs chroma upsampling and/or refresh operations as post-processing of the output pictures (381) from decoding to restore the pictures (381) to a higher-resolution chroma sampling format, and produces reconstructed pictures as output for an output destination (390).

The channel (350) produces coded data that has been channel coded. A channel decoder (620) can process the channel-coded data. For example, the channel decoder (620) or channel (350) may include elements (not shown), e.g., for FEC decoding and analog signal demodulation.

The metadata processing layer (622) receives data from the channel decoder (620) and processes it. The metadata processing layer (622) can extract and output, to the post-processor (385), pattern metadata (317) and/or region change metadata (318). The metadata processing layer (622) also outputs coded data (341) to a temporary coded data area (630). For example, the metadata processing layer (622) de-packetizes and/or demultiplexes data that has been organized for transmission or storage as a media stream or file.

Or, more generally, the metadata processing layer (622) can implement one or more media system demultiplexing protocols or transport protocols.

The coded data (341) is stored in the temporary coded data area (630) until a sufficient quantity of such data has been received. The coded data (341) includes coded pictures (631) (in the lower-resolution chroma sampling format) and MMCO/RPS information (632). The coded data (341) in the coded data area (630) contain, as part of the syntax of an elementary coded video bitstream, coded data for one or more pictures. The coded data (341) in the coded data area (630) can also include media metadata relating to the encoded video data (e.g., as one or more parameters in one or more SEI messages or VUI messages).

In general, the coded data area (630) temporarily stores coded data (341) until such coded data (341) is used by the video decoder (360). At that point, coded data for a coded picture (631) and MMCO/RPS information (632) are transferred from the coded data area (630) to the video decoder (360). As decoding continues, new coded data is added to the coded data area (630) and the oldest coded data remaining in the coded data area (630) is transferred to the video decoder (360).

Figure 7:
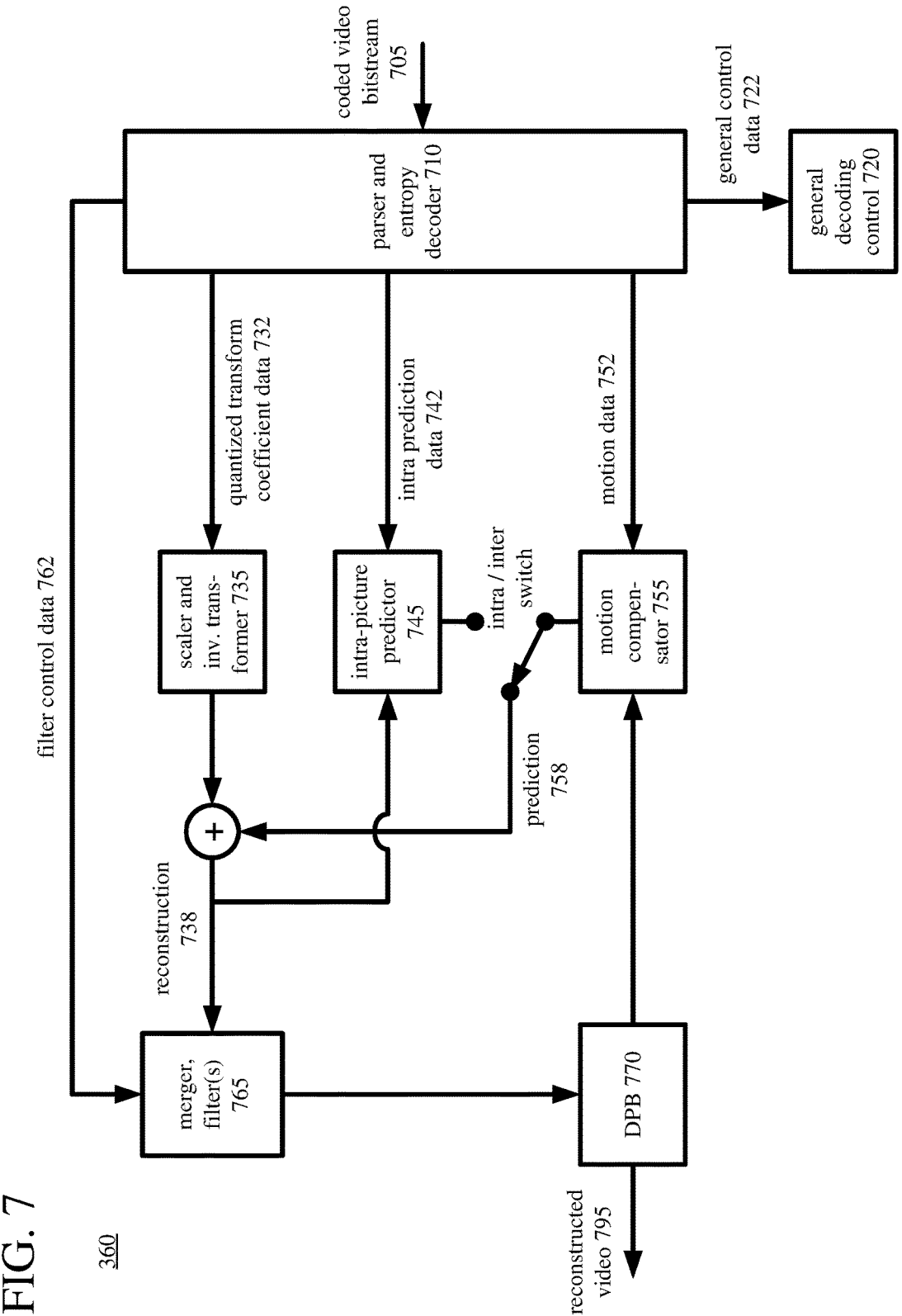
FIG. 7 is a diagram illustrating an example video decoder, in conjunction with which some described embodiments can be implemented.

The video decoder (360) decodes a coded picture (631) to produce a corresponding decoded picture (381) in the lower-resolution chroma sampling format. As shown in FIG. 7, the video decoder (360) receives the coded picture (631) as input as part of a coded video bitstream (705), and the video decoder (360) produces the corresponding decoded picture (381) as output as reconstructed video (795).

Generally, the video decoder (360) includes multiple decoding modules that perform decoding tasks such as entropy decoding, inverse quantization, inverse frequency transforms, motion compensation, intra-picture prediction, and filtering. Many of the components of the decoder (360) are used for both intra-picture decoding and inter-picture decoding. The exact operations performed by those components can vary depending on the type of information being decompressed. The format of the coded video bitstream (705) can be an extension or variation of Windows Media Video format, SMPTE 421M format, MPEG-x format (e.g., MPEG-1, MPEG-2, or MPEG-4), H.26x format (e.g., H.261, H.262, H.263, H.264, H.265), or VPx format, or another format.

A picture can be organized into multiple tiles of the same size or different sizes. A picture can also be organized as one or more slices. The content of a slice or tile can be further organized as blocks or other sets of sample values. Blocks may be further sub-divided at different stages. For example, a picture can be divided into 64×64 blocks, 32×32 blocks or 16×16 blocks, which can in turn be divided into smaller blocks of sample values. In implementations of decoding for the H.264/AVC standard, for example, a picture is divided into MBs and blocks. In implementations of decoding for the H.265/HEVC standard, for example, a picture is split into CTUs (CTBs), CUs (CBs), PUs (PBs) and TUs (TBs).

With reference to FIG. 7, a buffer receives encoded data in the coded video bitstream (705) and makes the received encoded data available to the parser/entropy decoder (710). The parser/entropy decoder (710) entropy decodes entropy-coded data, typically applying the inverse of entropy coding performed in the video encoder (340) (e.g., context-adaptive binary arithmetic decoding with binarization using Exponential-Golomb or Golomb-Rice). As a result of parsing and entropy decoding, the parser/entropy decoder (710) produces general control data (722), quantized transform coefficient data (732), intra prediction data (742) (e.g., intra-picture prediction modes), motion data (752), and filter control data (762).

The general decoding control (720) receives the general control data (722). The general decoding control (720) provides control signals (not shown) to other modules (such as the scaler/inverse transformer (735), intra-picture predictor (745), motion compensator (755), and intra/inter switch) to set and change decoding parameters during decoding.

With reference to FIG. 6, as appropriate, when performing its decoding process, the video decoder (360) may use one or more previously decoded pictures (669) as reference pictures for inter-picture prediction. The video decoder (360) reads such previously decoded pictures (669) from a decoded picture temporary memory storage area (660), which is, for example, DPB (770).

With reference to FIG. 7, if the current picture is predicted using inter-picture prediction, a motion compensator (755) receives the motion data (752), such as MV data, reference picture selection data and merge mode index values. The motion compensator (755) applies MVs to the reconstructed reference picture(s) from the DPB (770). The motion compensator (755) produces motion-compensated predictions for inter-coded blocks of the current picture.

In a separate path within the video decoder (360), the intra-picture predictor (745) receives the intra prediction data (742), such as information indicating the prediction mode/direction used. For intra spatial prediction, using values of a reconstruction (738) of the current picture, according to the prediction mode/direction, the intra-picture predictor (745) spatially predicts sample values of a current block of the current picture from previously reconstructed sample values of the current picture. Or, for intra block copy mode, the intra-picture predictor (75) predicts the sample values of a current block using previously reconstructed sample values of a reference block, which is indicated by an offset (block vector) for the current block.

The intra/inter switch selects values of a motion-compensated prediction or intra-picture prediction for use as the prediction (758) for a given block. For example, when H.265/HEVC syntax is followed, the intra/inter switch can be controlled based on a syntax element encoded for a CU of a picture that can contain intra-predicted CUs and inter-predicted CUs. When residual values have been encoded/signaled, the video decoder (360) combines the prediction (758) with reconstructed residual values to produce the reconstruction (738) of the content from the video signal. When residual values have not been encoded/signaled, the video decoder (360) uses the values of the prediction (758) as the reconstruction (738).

The video decoder (360) also reconstructs prediction residual values. To reconstruct the residual when residual values have been encoded/signaled, the scaler/inverse transformer (735) receives and processes the quantized transform coefficient data (732). In the scaler/inverse transformer (735), a scaler/inverse quantizer performs inverse scaling and inverse quantization on the quantized transform coefficients. The scaler/inverse transformer (735) sets values for QP for a picture, tile, slice and/or other portion of video based on syntax elements in the bitstream. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof). If the frequency transform was skipped during encoding, the inverse frequency transform is also skipped. In this case, the scaler/inverse quantizer can perform inverse scaling and inverse quantization on blocks of prediction residual data (or sample value data), producing reconstructed values. The video decoder (360) combines reconstructed prediction residual values with prediction values of the prediction (758), producing values of the reconstruction (738).

For intra-picture prediction, the values of the reconstruction (738) can be fed back to the intra-picture predictor (745). For inter-picture prediction, the values of the reconstruction (738) can be further filtered. In the merger/filter(s) (765), the video decoder (360) merges content from different tiles into a reconstructed version of the picture. The video decoder (360) selectively performs deblock filtering and SAO filtering according to the filter control data (762) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the video decoder (360) or a syntax element within the encoded bitstream data. The DPB (770) buffers the reconstructed current picture for use as a reference picture in subsequent motion-compensated prediction.

The video decoder (360) can also include a post-processing filter. The post-processing filter can perform deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter is applied to reconstructed sample values outside of the motion compensation loop, before output for display.

With reference to FIG. 6, the decoded picture temporary memory storage area (660) includes multiple picture buffer storage areas (661, 662, . . . , 66n). The decoded picture storage area (660) is, for example, the DPB (770). The decoder (360) uses the MMCO/RPS information (632) to identify a picture buffer (661, 662, etc.) in which it can store a decoded picture (651). The decoder (360) stores the decoded picture (651) in that picture buffer. The decoder (360) also determines whether to remove any reference pictures from the multiple picture buffer storage areas (661, 662, . . . , 66n).

An output sequencer (680) identifies when the next picture to be produced in display order (also called output order) is available in the decoded picture storage area (660). When the next picture (681) to be produced in display order is available in the decoded picture storage area (660), it is read by the output sequencer (680) and provided to the post-processor (385) as the output picture (381) in the lower-resolution chroma sampling format. In general, the order in which pictures are output from the decoded picture storage area (660) by the output sequencer (680) (display order) may differ from the order in which the pictures are decoded by the decoder (360) (bitstream order).

As described with reference to FIG. 3, the post-processor (385) performs post-processing operations on the decoded pictures (381) after decoding, producing output pictures (386). The post-processor (385) receives pattern metadata (317) and, in some implementations, region change metadata (318) from the metadata processing layer (622). The post-processor (385) uses the pattern metadata (317) and, where applicable, region change metadata (318), as described with reference to FIG. 3. The post-processor (385) provides the output pictures (386) to an output destination (390), e.g., display.

Depending on implementation and the type of decompression desired, modules of the video decoder system (600) and/or video decoder (360) can be added, omitted, split into multiple modules, combined with other modules, and/or replaced with like modules. In alternative embodiments, decoder systems or decoders with different modules and/or other configurations of modules perform one or more of the described techniques. Specific embodiments of decoder systems typically use a variation or supplemented version of the video decoder system (600). Specific embodiments of video decoders typically use a variation or supplemented version of the video decoder (360). The relationships shown between modules within the video decoder system (600) and video decoder (360) indicate general flows of information in the video decoder system (600) and video decoder (360), respectively; other relationships are not shown for the sake of simplicity. In general, a given module of the video decoder system (600) or video decoder (360) can be implemented by software executable on a CPU, by software controlling special-purpose hardware (e.g., graphics hardware for video acceleration), or by special-purpose hardware (e.g., in an ASIC).

VI. Selective Upsampling or Refresh of Chroma Sample Values.

This section describes various innovations in delivery of video in a chroma sampling format with a higher chroma sampling rate (such as a YUV 4:4:4 format) using a video encoder and decoder that operate on video in another chroma sampling format with a lower chroma sampling rate (such as YUV 4:2:0). In many scenarios, the innovations enable recovery of stationary content in video at the higher chroma sampling rate, even when the video is encoded and decoded at the lower chroma sampling rate, without significantly increasing bit rate. Also, approaches described herein can preserve chroma information from pictures in a higher-resolution chroma sampling format, while leveraging commercially available codecs adapted for a lower-resolution chroma sampling format. In particular, since YUV 4:2:0 is a widely supported chroma sampling format in products, having an effective way of conveying YUV 4:4:4 content through such codecs can provide the substantial benefit of enabling widespread near-term deployment of YUV 4:4:4 capabilities.

In some example implementations, pre-processing operations for chroma sample values do not require interaction with or modification of a video encoder, and post-processing operations for chroma sample values do not require interaction with or modification of a video decoder. The pre-processing operations and post-processing operations do not require any extension or modification of an elementary bitstream format used by a video encoder or decoder. As such, widely-deployed video codec technology adapted for YUV 4:2:0 video content can be employed to deliver YUV 4:4:4 video content.

A. Examples of Selective Upsampling or Refresh of Chroma Sample Values.

FIG. 8 shows a generalized example (800) of chroma sub-sampling from a YUV 4:4:4 format to a YUV 4:2:0 format, as well as selective upsampling and/or refresh of chroma sample values for one picture. In FIG. 8, a current picture (801) in a YUV 4:4:4 format includes a luma plane ($Y_{444}$ plane) and two chroma planes ($U_{444}$ plane, $V_{444}$ plane). A pre-processor performs chroma sub-sampling operations on chroma sample values of the current picture (801) in the YUV 4:4:4 format, converting it to the current picture (802) in a YUV 4:2:0 format. For the current picture (802) in the YUV 4:2:0 format, the spatial resolution of the luma plane ($Y_{444}$ plane) is unchanged, but the spatial resolution for each of the two chroma planes ($U_{444}$ plane, $V_{444}$ plane) is halved horizontally and vertically. This reduces the number of chroma sample values for the current picture by 75%, producing two sub-sampled chroma planes ($U_{420}$ plane, $V_{420}$ plane).

The current picture (802) in the YUV 4:2:0 format is encoded, and encoded data for the current picture is transferred to a decoder. The encoded data is decoded, producing a reconstructed current picture (803) in the YUV 4:2:0 format. The reconstructed current picture (803) in the YUV 4:2:0 format still includes a full-resolution luma plane ($Y_{444}$ plane) and two sub-sampled chroma planes ($U_{420}$ plane, $V_{420}$ plane), but the sample values may exhibit some distortion (reconstruction error) due to quantization and/or other operations performed during encoding. A post-processor performs chroma upsampling operations and/or refresh operations using chroma sample values of the current picture (803) in the YUV 4:2:0 format, producing a reconstructed current picture (804) in the YUV 4:4:4 format. The reconstructed current picture (804) in the YUV 4:4:4 format includes a full-resolution luma plane ($Y_{444}$ plane) and two full-resolution chroma planes ($U_{444}$ plane, $V_{444}$ plane).

For example, in a stationary region of the higher-chroma-resolution current picture (804), starting from the reconstructed chroma sample values in the YUV 4:4:4 format for the previous picture in display order, the post-processor refreshes reconstructed chroma sample values at selected positions of the two full-resolution chroma planes ($U_{444}$ plane, $V_{444}$ plane) using reconstructed sample values of the two sub-sampled chroma planes ($U_{420}$ plane, $V_{420}$ plane) of the lower-chroma-resolution current picture (803). The selected positions vary according to a refresh pattern. Chroma sample values in the stationary region of the higher-chroma-resolution current picture (804) at other, non-selected positions of the two full-resolution chroma planes ($U_{444}$ plane, $V_{444}$ plane) are unchanged. (Such chroma sample values were refreshed or upsampled for previous picture(s) in display order, and will be refreshed or upsampled for subsequent picture(s) in display order.) In a non-stationary region of the higher-chroma-resolution current picture (804), the post-processor sets reconstructed chroma sample values at all positions of the two full-resolution chroma planes ($U_{444}$ plane, $V_{444}$ plane) by upsampling reconstructed sample values of the two sub-sampled chroma planes ($U_{420}$ plane, $V_{420}$ plane) of the lower-chroma-resolution reconstructed current picture (803). The upsampled chroma sample values can be filtered to mitigate discontinuities or artifacts (e.g., using a lowpass filter).

Figure 9B:
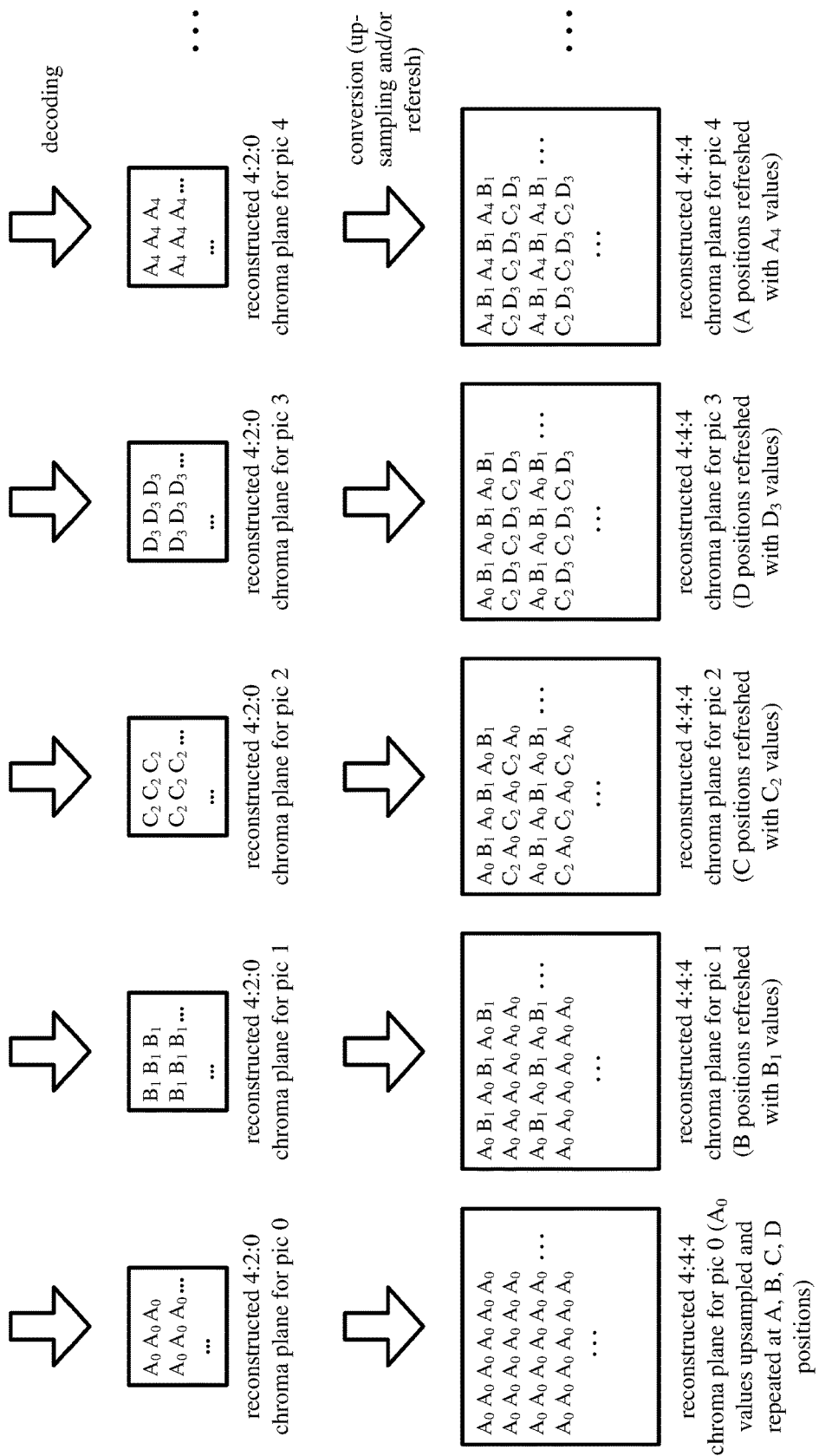
Figure 9D:
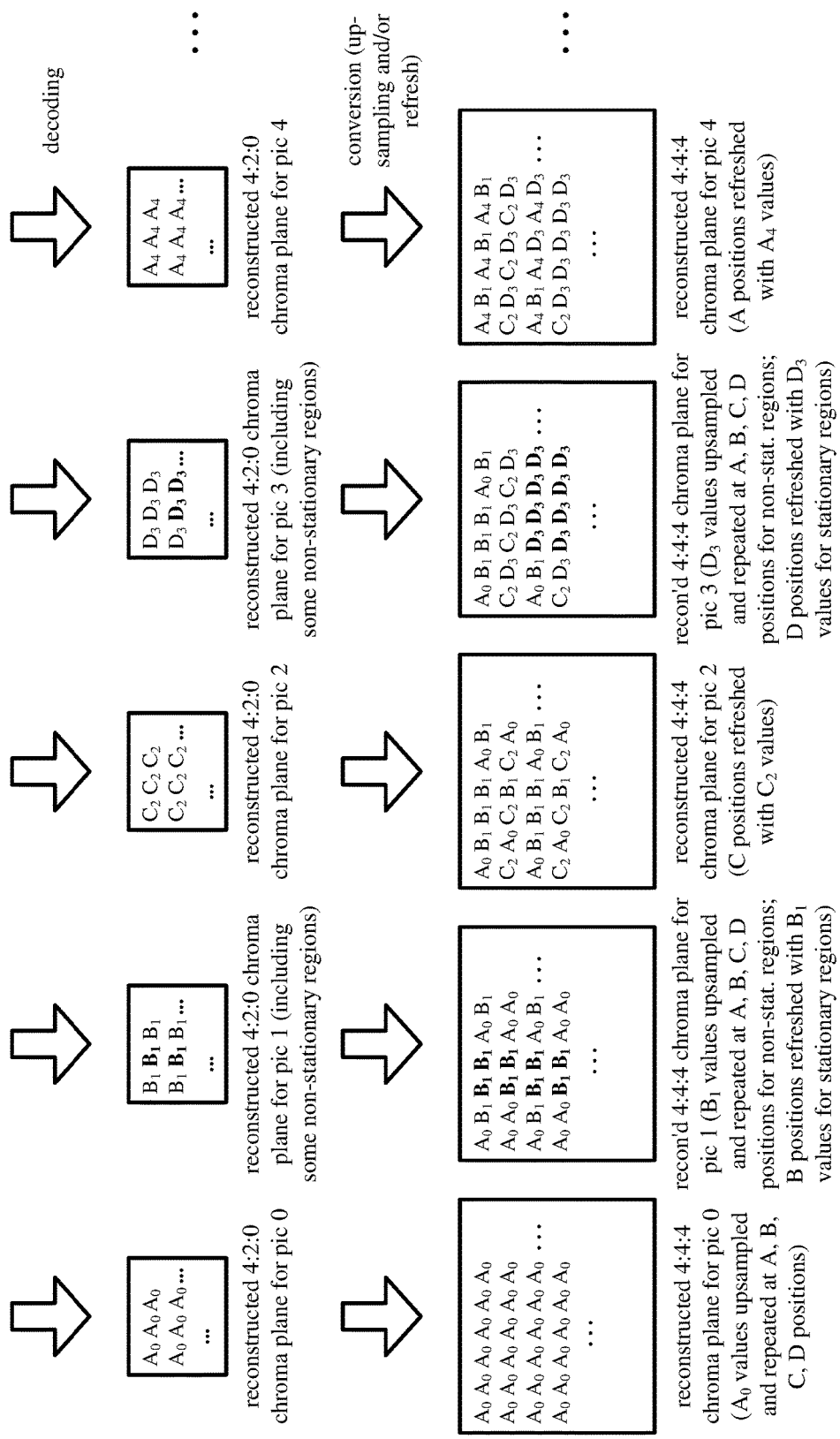

FIG. 9a shows an example (901) of chroma sub-sampling from a YUV 4:4:4 format to a YUV 4:2:0 format. FIGS. 9b-9d show alternative examples (902, 903, 904) of selective upsampling and/or refresh of chroma sample values, continuing the example (901) of FIG. 9a.

FIGS. 9a-9d use the same notation for positions of chroma sample values. $A_n$ indicates an even position of an even row of a chroma plane of picture n in a YUV 4:4:4 format. $B_n$ indicates an odd position of an even row of a chroma plane of picture n in the YUV 4:4:4 format. $C_n$ indicates an even position of an odd row of a chroma plane of picture n in the YUV 4:4:4 format. Finally, $D_n$ indicates an odd position of an odd row of a chroma plane of picture n in the YUV 4:4:4 format. The chroma planes can be U component planes or V component planes.

FIG. 9a shows chroma planes for pictures 0 through 4 of a sequence. In each of the pictures in YUV 4:4:4 format, chroma sample values can be logically organized in 2×2 regions, with each 2×2 region including an "A" position, a "B" position to its right, a "C" position below it, and a "D" position adjacent the "B" and "C" positions. When the chroma planes in the YUV 4:4:4 format (4:4:4 chroma planes) are converted to chroma planes in the YUV 4:2:0 format (4:2:0 chroma planes), chroma sample values at different positions are retained according to a refresh pattern. For picture 0, chroma sample values at the "A" position in each 2×2 region are retained. For picture 1, chroma sample values at the "B" position in each 2×2 region are retained. For picture 2, chroma sample values at the "C" position in each 2×2 region are retained. Finally, for picture 3, chroma sample values at the "D" position in each 2×2 region are retained. Then, the refresh pattern repeats. For picture 4, chroma sample values at the "A" position in each 2×2 region are retained. After chroma sub-sampling, the 4:2:0 chroma planes are encoded, and encoded data is transferred to a decoder.

Thus, for different pictures in series, the pre-processor retains chroma sample values at different positions of the YUV 4:4:4 format. Collectively, the pre-processor selects all positions for chroma sample values in the YUV 4:4:4 format in any span of four pictures, with one quarter of the positions being selected for each of the four pictures. In this way, for stationary content, chroma sample values at full YUV 4:4:4 resolution can be recovered after decoding the four pictures. For example, for picture n, the pre-processor selects even positions in even lines (e.g., rows, columns). For picture n+1, the pre-processor selects odd positions in the even lines. For picture n+2, the pre-processor selects even positions in odd lines. For picture n+3, the pre-processor selects odd positions in the odd lines. Collectively, for stationary content, full chroma-resolution information is encoded in the pictures n, n+1, n+2, and n+3. The pre-processor can repeat the refresh pattern for picture n+4, picture n+5, and so on. Pictures n, n+1, n+2, n+3, etc. are encoded in a YUV 4:2:0 format.

At the decoder side, after the frames in the YUV 4:2:0 format are decoded, a post-processor selectively upsamples or refreshes reconstructed chroma sample values. Conceptually, when performing upsampling or refresh operations for reconstructed chroma sample values of a current picture n, the post-processor potentially combines reconstructed chroma sample values from the current picture n and up to three previous pictures n−1, n−2, and n−3 in display order. Reconstructed chroma sample values from pictures n, n−1, n−2, and n−3, which were encoded and decoded in a YUV 4:2:0 format, can be combined to recover chroma sample values at full YUV 4:4:4 resolution, at least for stationary content. On the other hand, for non-stationary content, reconstructed chroma sample values from only the current picture are used, in upsampling operations, to provide reconstructed chroma sample values at YUV 4:4:4 resolution for the current picture. In this case, since chroma information for full YUV 4:4:4 resolution is spread across four pictures, some blurriness may be introduced in the reconstructed chroma sample values of the current picture due to loss of chroma information. Full YUV 4:4:4 resolution is important for stationary content, which may be the focus of a viewer's attention (e.g., when the viewer is reading text). Full YUV 4:4:4 resolution is less important for non-stationary content (e.g., when the viewer is scrolling through text), since the viewer probably cannot focus on fine detail due to movement or other changes in the content. When non-stationary content becomes stationary, chroma sample values at full YUV 4:4:4 resolution can quickly be recovered (that is, within four pictures), allowing the viewer to perceive fine chroma-resolution details again.

FIGS. 9b-9d illustrate various features of selective upsampling and/or refresh of chroma sample values.

1. First Example of Selective Upsampling and/or Refresh.

FIG. 9b shows a simple example (902) of selective upsampling and/or refresh of reconstructed chroma sample values for stationary content (after the first picture), continuing the example (901) of FIG. 9a. For each of the pictures 0-4, reconstructed chroma sample values of the 4:2:0 chroma plane for a current picture are either (1) upsampled to determine reconstructed chroma sample values in the 4:4:4 chroma plane for the current picture, or (2) used to refresh reconstructed chroma sample values at selected positions in the 4:4:4 chroma plane, starting from the reconstructed chroma sample values in the 4:4:4 chroma plane for the previous picture in display order. For picture 0, which is the first picture of the sequence, there are no reconstructed chroma sample values to refresh. Thus, the reconstructed chroma sample values of the 4:2:0 chroma plane for picture 0 are upsampled to determine reconstructed chroma sample values in the 4:4:4 chroma plane for picture 0. For example, a given chroma sample value at a position of the 4:2:0 chroma plane for picture 0 is repeated at each position (A, B, C, and D) of a corresponding 2×2 region of the 4:4:4 chroma plane for picture 0. Further, the chroma sample values for the positions (A, B, C, and D) of the 2×2 region can be filtered to mitigate discontinuities or artifacts (e.g., using a lowpass filter). At this stage, all of the reconstructed chroma sample values of the 4:4:4 chroma plane have been determined by upsampling of chroma sample values at positions of the 4:2:0 chroma plane.

For picture 1, there are reconstructed chroma sample values in the 4:4:4 chroma plane for picture 0 to refresh. Reconstructed chroma sample values of the 4:2:0 chroma plane for picture 1 are used to refresh reconstructed chroma sample values at "B" positions in the 4:4:4 chroma plane from picture 0. For example, a given chroma sample value at a position of the 4:2:0 chroma plane for picture 1 is used to refresh the reconstructed chroma sample value at the "B" position of a corresponding 2×2 region of the 4:4:4 chroma plane from picture 0. Similarly, for picture 2, reconstructed chroma sample values of the 4:2:0 chroma plane for picture 2 are used to refresh reconstructed chroma sample values at "C" positions in the 4:4:4 chroma plane from picture 1. For example, a given chroma sample value at a position of the 4:2:0 chroma plane for picture 2 is used to refresh the reconstructed chroma sample value at the "C" position of a corresponding 2×2 region of the 4:4:4 chroma plane from picture 1. Finally, for picture 3, reconstructed chroma sample values of the 4:2:0 chroma plane for picture 3 are used to refresh reconstructed chroma sample values at "D" positions in the 4:4:4 chroma plane from picture 2. For example, a given chroma sample value at a position of the 4:2:0 chroma plane for picture 3 is used to refresh the reconstructed chroma sample value at the "D" position of a corresponding 2×2 region of the 4:4:4 chroma plane from picture 2. At this stage, reconstructed chroma sample values at full YUV 4:4:4 resolution have been recovered using chroma sample values from all positions of the YUV 4:4:4 format (albeit from four different pictures, 0 to 3).

Starting at picture 4, the refresh pattern repeats. For picture 4, reconstructed chroma sample values of the 4:2:0 chroma plane for picture 4 are used to refresh reconstructed chroma sample values at "A" positions in the 4:4:4 chroma plane from picture 3. For example, a given chroma sample value at a position of the 4:2:0 chroma plane for picture 4 is used to refresh the reconstructed chroma sample value at the "A" position of a corresponding 2×2 region of the 4:4:4 chroma plane from picture 3.

2. Second Example of Selective Upsampling and/or Refresh.

In the example (902) of FIG. 9b, video includes stationary content. In practice, a picture may include at least some non-stationary content. FIG. 9c shows a more complicated example (903) of selective upsampling and/or refresh of reconstructed chroma sample values for non-stationary content, again continuing the example (901) of FIG. 9a. For each of the pictures 0-4, reconstructed chroma sample values of the 4:2:0 chroma plane for a current picture are either (1) upsampled to determine reconstructed chroma sample values in the 4:4:4 chroma plane for the current picture, or (2) used to refresh reconstructed chroma sample values at selected positions in the 4:4:4 chroma plane from the previous picture in display order. For pictures 0 and 1, reconstructed chroma sample values of the 4:2:0 chroma plane for the current picture are upsampled (for picture 0) or used in refresh operations (for picture 1), as described with reference to FIG. 9b.

For picture 2, the entire 4:2:0 chroma plane is non-stationary (shown as boldface positions), compared to picture 1. Reconstructed chroma sample values of the 4:2:0 chroma plane for picture 2 are upsampled to determine reconstructed chroma sample values in the 4:4:4 chroma plane for picture 2. For example, a given chroma sample value at a position of the 4:2:0 chroma plane for picture 2 is repeated at each position (A, B, C, and D) of a corresponding 2×2 region of the 4:4:4 chroma plane for picture 2. The chroma sample values for the positions (A, B, C, and D) of the 2×2 region can be filtered to mitigate discontinuities or artifacts (e.g., using a lowpass filter). At this stage, all of the reconstructed chroma sample values of the 4:4:4 chroma plane have been determined by upsampling of chroma sample values at positions of the 4:2:0 chroma plane for picture 2. For picture 3, reconstructed chroma sample values of the 4:2:0 chroma plane for picture 3 are used to refresh reconstructed chroma sample values at "D" positions in the 4:4:4 chroma plane from picture 2. For example, a given chroma sample value at a position of the 4:2:0 chroma plane for picture 3 is used to refresh the reconstructed chroma sample value at the "D" position of a corresponding 2×2 region of the 4:4:4 chroma plane from picture 2. For picture 4, reconstructed chroma sample values of the 4:2:0 chroma plane for picture 4 are used to refresh reconstructed chroma sample values at "A" positions in the 4:4:4 chroma plane from picture 3. For example, a given chroma sample value at a position of the 4:2:0 chroma plane for picture 4 is used to refresh the reconstructed chroma sample value at the "A" position of a corresponding 2×2 region of the 4:4:4 chroma plane from picture 3.

Assuming content remains stationary, reconstructed chroma sample values of a 4:2:0 chroma plane for the next picture (picture 5) will be used to refresh chroma sample values at "B" positions. Reconstructed chroma sample values at full YUV 4:4:4 resolution will be recovered using chroma sample values from all positions of the YUV 4:4:4 format (albeit from four different pictures, 2 to 5).

3. Third Example of Selective Upsampling and/or Refresh.

FIG. 9d shows another example (904) of selective upsampling and/or refresh of reconstructed chroma sample values for a mix of stationary content and non-stationary content, again continuing the example (901) of FIG. 9a. On a region-by-region basis, for each of the pictures 0-4, reconstructed chroma sample values of the 4:2:0 chroma plane for a current picture are either (1) upsampled to determine reconstructed chroma sample values in the 4:4:4 chroma plane for the current picture, or (2) used to refresh reconstructed chroma sample values at selected positions in the 4:4:4 chroma plane from the previous picture in display order. For picture 0, reconstructed chroma sample values of the 4:2:0 chroma plane are upsampled, as described with reference to FIG. 9b.

For picture 1, some regions are non-stationary (shown as boldface positions) and other regions are stationary, compared to picture 0. For each non-stationary region, reconstructed chroma sample values of the 4:2:0 chroma plane for picture 1 are upsampled to determine reconstructed chroma sample values in the 4:4:4 chroma plane for picture 1. For example, a given chroma sample value at a position of a non-stationary region of the 4:2:0 chroma plane for picture 1 is repeated at each position (A, B, C, and D) of a corresponding 2×2 region of the 4:4:4 chroma plane for picture 1. The chroma sample values for the positions (A, B, C, and D) of the 2×2 region can be filtered to mitigate discontinuities or artifacts (e.g., using a lowpass filter). For each stationary region, reconstructed chroma sample values of the 4:2:0 chroma plane for picture 1 are used to refresh reconstructed chroma sample values at "B" positions in the 4:4:4 chroma plane from picture 0. For example, a given chroma sample value at a position of the 4:2:0 chroma plane for picture 1 is used to refresh the reconstructed chroma sample value at the "B" position of a corresponding, stationary 2×2 region of the 4:4:4 chroma plane for picture 0.

Picture 2 is stationary, compared to picture 1. For picture 2, reconstructed chroma sample values of the 4:2:0 chroma plane for picture 2 are used to refresh reconstructed chroma sample values at "C" positions in the 4:4:4 chroma plane from picture 1. For example, a given chroma sample value at a position of the 4:2:0 chroma plane for picture 2 is used to refresh the reconstructed chroma sample value at the "C" position of a corresponding 2×2 region of the 4:4:4 chroma plane from picture 1.

For picture 3, some regions are non-stationary (shown as boldface positions) and other regions are stationary, compared to picture 2. Some of the non-stationary regions are different in pictures 1 and 3, and some of the non-stationary regions are the same in pictures 1 and 3. For each non-stationary region, reconstructed chroma sample values of the 4:2:0 chroma plane for picture 3 are upsampled to determine reconstructed chroma sample values in the 4:4:4 chroma plane for picture 3. For example, a given chroma sample value at a position of a non-stationary region of the 4:2:0 chroma plane is repeated at each position (A, B, C, and D) of a corresponding 2×2 region of the 4:4:4 chroma plane for picture 3. The chroma sample values for the positions (A, B, C, and D) of the 2×2 region can be filtered to mitigate discontinuities or artifacts (e.g., using a lowpass filter). For each stationary region, reconstructed chroma sample values of the 4:2:0 chroma plane for picture 3 are used to refresh reconstructed chroma sample values at "D" positions in the 4:4:4 chroma plane from picture 2. For example, a given chroma sample value at a position of the 4:2:0 chroma plane for picture 3 is used to refresh the reconstructed chroma sample value at the "D" position of a corresponding, stationary 2×2 region of the 4:4:4 chroma plane from picture 2.

Picture 4 is stationary, compared to picture 3. For picture 4, reconstructed chroma sample values of the 4:2:0 chroma plane for picture 4 are used to refresh reconstructed chroma sample values at "A" positions in the 4:4:4 chroma plane from picture 3. For example, a given chroma sample value at a position of the 4:2:0 chroma plane for picture 4 is used to refresh the reconstructed chroma sample value at the "A" position of a corresponding 2×2 region of the 4:4:4 chroma plane from picture 3.

Assuming content remains stationary, reconstructed chroma sample values of a 4:2:0 chroma plane for the next picture (picture 5) will be used to refresh chroma sample values at "B" positions, and reconstructed chroma sample values of a 4:2:0 chroma plane for the picture after that (picture 6) will be used to refresh chroma sample values at "C" positions. At that point, reconstructed chroma sample values at full YUV 4:4:4 resolution will be recovered using chroma sample values from all positions of the YUV 4:4:4 format (albeit from four different pictures, 3 to 6).

B. Examples of Refresh Patterns, Pattern Metadata, and Region Change Metadata.

In the preceding section, chroma sub-sampling and refresh operations follow a refresh pattern of A (even positions of even rows), B (odd positions of even rows), C (even positions of odd rows), and D (odd positions of odd rows). Alternatively, chroma sub-sampling and refresh operations can follow a different refresh pattern (e.g., A, D, B, C; or A, C, D, B; or a refresh pattern that alternates positions along columns not rows).

A pre-processor can determine and output pattern metadata, which indicates, for a refresh pattern as applied for a picture, which of the chroma sample values of the picture in a higher-resolution chroma sampling format have been retained for that picture in a lower-resolution chroma sampling format. At the decoder side, the post-processor can use the pattern metadata to determine positions (in the higher-resolution chroma sampling format) to be refreshed using reconstructed chroma sample values from the picture in the lower-resolution chroma sampling format. The pattern metadata can be signaled as part of an SEI message, as part of a field of a container, or in some other way.

Pattern metadata can be signaled per picture (on a picture-by-picture basis). In the examples of FIGS. 9a-9d, pattern metadata for picture 0 can indicate chroma sample values at "A" positions have been retained for that picture, pattern metadata for picture 1 can indicate chroma sample values at "B" positions have been retained for that picture, pattern metadata for picture 2 can indicate chroma sample values at "C" positions have been retained for that picture, and so on. Even if one or more pictures are dropped, a post-processor can identify the appropriate positions at which to refresh chroma sample values for the next picture.

Alternatively, pattern metadata can be signaled at some other frequency (e.g., on a slice-by-slice basis, on a tile-by-tile basis).

Or, a pre-processor and post-processor can follow an implied pattern, without signaling of pattern metadata. For example, the pre-processor and post-processor restart the refresh pattern at a pre-defined event, which can be the first picture of a video sequence, first picture after a scene change, or any full replacement of chroma sample values of a picture with upsampling. Or, the pre-processor can restart the refresh pattern at an arbitrary picture, and send a restart event signal to the post-processor, which restarts the refresh pattern at that picture. So long as picture count values are accurate and available (or if not available, so long as pictures are not dropped), the pre-processor and post-processor can remain in synchronization with respect to the refresh pattern of positions for chroma sub-sampling and refresh operations.

A pre-processor can also determine and output region change metadata, which indicates whether regions of a current picture are stationary or non-stationary. Different ways of determining region change metadata are described above and below. At the decoder side, a post-processor can use the region change metadata to determine whether to perform upsampling operations or refresh operations on a region-by-region basis, as explained below. The region change metadata can be signaled as part of a SEI message, as part of a field of a container, or in some other way.

The region change metadata can be signaled per picture (on a picture-by-picture basis). In the examples of FIGS. 9a-9d, region change metadata for picture 0 can indicate whether respective regions of picture 0 are stationary or non-stationary, region change metadata for picture 1 can indicate whether respective regions of picture 1 are stationary or non-stationary, and so on. Alternatively, the region change metadata can be signaled at some other frequency.

The region change metadata can be a single bit per region. In the region change metadata, a single bit can represent a region within which positions repeat according to the refresh pattern (e.g., a 2×2 region in the examples of FIGS. 9a-9d). Or, a single bit can represent a larger region that corresponds to a block, TB, PB, CB, etc., which potentially includes multiple regions according to a refresh pattern. For example, a single bit represents an 8×8 region, 16×16 region, or other region that includes multiple 2×2 regions for a refresh pattern. When bits represent larger regions in this way, region change metadata can be represented using fewer bits, but a region designated as non-stationary might include one or more 2×2 regions that are, in fact, stationary, which can unnecessarily introduce blurriness or other distortion in reconstructed chroma sample values.

Alternatively, region change metadata can be represented using coordinates of rectangles for non-stationary regions. With respect to the size of rectangles, there is again a tradeoff between bit rate of the region change metadata (potentially higher for many small rectangles, and lower for a single large rectangle) and granularity of the region change designations (a large rectangle may include smaller stationary regions). Alternatively, region change metadata can be represented in some other way.

A pre-processor can encode region change metadata. For example, when region change metadata is a set of bits for regions, the region change metadata can be encoded using CABAC, bit plane coding, or some other type of entropy coding. A post-processor performs corresponding decoding of the region change metadata. As another example, when region change metadata is coordinates of rectangles for non-stationary regions, the coordinates can be differentially coded and/or variable length coded.

Alternatively, a pre-processor does not determine or output region change metadata. Instead, a post-processor independently determines whether the respective regions of a current picture are stationary or non-stationary, as described below.

C. Examples of Pre-Processing Operations.

FIG. 10 shows generalized technique (1000) for pre-processing chroma sample values from a higher chroma sampling rate to a lower chroma sampling rate, to facilitate recovery of stationary content at the higher chroma sampling rate. A pre-processor as described with reference to FIG. 3 or other pre-processor can perform the technique (1000).

The pre-processor receives (1010) a current picture in a first chroma sampling format, which has a first chroma sampling rate. The pre-processor converts (1020) the current picture to a second chroma sampling format, which has a second chroma sampling rate lower than the first chroma sampling rate. For example, the first (higher-resolution) chroma sampling format is a YUV 4:4:4 format, and the second (lower-resolution) chroma sampling format is a YUV 4:2:2 format, YUV 4:2:0 format, or YUV 4:1:1 format. Or, as another example, the first (higher-resolution) chroma sampling format is a YUV 4:2:2 format, and the second (lower-resolution) chroma sampling format is a YUV 4:2:0 format or YUV 4:1:1 format.

As part of the conversion of the current picture to the second chroma sampling format, the pre-processor retains chroma sample values of the current picture in the first (higher-resolution) chroma sampling format that are at selected positions among positions of the first chroma sampling format. The selected positions vary according to a refresh pattern that facilitates recovery of stationary content at the first chroma sampling rate. Examples of refresh patterns are described above. As part of the conversion of the current picture to the second (lower-resolution) chroma sampling format, the pre-processor also discards chroma sample values of the current picture in the first chroma sampling format that are at other, non-selected positions among the positions of the first chroma sampling format.

The pre-processor checks (1030) whether to continue with the next picture. If so, the pre-processor receives (1010) the next picture (as the current picture) in the first (higher-resolution) chroma sampling format. In this way, the pre-processor can repeat the receiving (1010) and converting (1020) operations for each of one or more subsequent pictures, treating each subsequent picture as the current picture.

Subsequently, a video encoder can encode the current picture that has been converted to the second chroma sampling format (and each of the subsequent pictures). This produces encoded data, which can be output as part of a bitstream. Overall, by retaining different chroma sample values in consecutive pictures, the pre-processor can hurt coding efficiency in some scenarios (e.g., when fewer units are encoded as skipped units due to non-zero residual values for chroma blocks after motion compensation). To provide for recovery of stationary content at a higher-resolution chroma sampling rate, a larger number of distinct chroma sample values may be encoded (e.g., as non-zero residual values for chroma blocks after motion compensation). Typically, however, increases in bit rate are not significant.

The pre-processor can determine and output pattern metadata. The pattern metadata indicates, for the refresh pattern as applied for the current picture, which of the chroma sample values of the current picture in the first (higher-resolution) chroma sampling format have been retained for the current picture in the second chroma sampling format. Examples of pattern metadata are described above. Alternatively, the pre-processor does not determine or output pattern metadata, instead relying on a refresh pattern defined at the pre-processor and corresponding post-processor.

The pre-processor can also determine and output region change metadata. The region change metadata indicates whether one or more regions (of the current picture), respectively, are stationary or non-stationary relative to a previous picture in display order (typically, the immediately previous picture). For each of one or more regions of the current picture, the pre-processor can determine whether the region is stationary or non-stationary relative to the previous picture. The determination of whether a region is stationary or non-stationary can made in various ways.

For example, the determination is based at least in part on information from an OS component indicating which of the one or more regions has changed relative to the previous picture. In some example implementations, the information from the OS component is "hint" information from a graphics component that reports "dirty" regions in the current picture, which have changed since the previous picture. Such hint information can be provided by the OS component for each component plane of the current picture.

Alternatively, the determination of whether a region is stationary or non-stationary can be based at least in part on results of comparing chroma sample values in the region with corresponding chroma sample values of a co-located region in the previous picture. The pre-processor can directly check for changes in chroma sample values between the current picture and previous picture. If the chroma sample values are unchanged, the region is deemed to be stationary. Otherwise (at least one chroma sample value is different), the region is deemed to be non-stationary.

Alternatively, the determination of whether a region is stationary or non-stationary can be made in some other way.

Alternatively, the pre-processor does not determine or output region change metadata. Instead, a post-processor determines whether regions are stationary or non-stationary using information available after decoding (e.g., reconstructed luma sample values).

D. Examples of Post-Processing Operations.

FIG. 11 shows a generalized technique (1100) for post-processing chroma sample values from a lower chroma sampling rate to a higher chroma sampling rate, in order to recover stationary content at the higher chroma sampling rate. A post-processor as described with reference to FIG. 3 or other post-processor can perform the technique (1100).

The post-processor receives (1110) a current picture in a second chroma sampling format, which has a second chroma sampling rate, and converts (1120) the current picture to a first chroma sampling format. The first chroma sampling format has a first chroma sampling rate, which is higher than the second chroma sampling rate. For example, the first (higher-resolution) chroma sampling format is a YUV 4:4:4 format, and the second (lower-resolution) chroma sampling format is a YUV 4:2:2 format, YUV 4:2:0 format, or YUV 4:1:1 format. Or, as another example, the first (higher-resolution) chroma sampling format is a YUV 4:2:2 format, and the second (lower-resolution) chroma sampling format is a YUV 4:2:0 format or YUV 4:1:1 format. The conversion of the current picture to the first (higher-resolution) chroma sampling format includes selective upsampling or refresh of chroma sample values.

For example, to refresh chroma sample values within a region of the current picture, the post-processor performs several operations. Starting from reconstructed chroma sample values of the first (higher-resolution) chroma sampling format in the previous picture in display order, at selected positions among positions of the first (higher-resolution) chroma sampling format, the post-processor refreshes chroma sample values in the first chroma sampling format using chroma sample values of the current picture in the second (lower-resolution) chroma sampling format. The selected positions vary according to a refresh pattern that facilitates recovery of stationary content at the first (higher-resolution) chroma sampling rate. Examples of refresh patterns are described above. At other, non-selected positions among the positions of the first chroma sampling format, the post-processor retains chroma sample values reconstructed from one or more previous pictures, in display order, in the second chroma sampling format. The decision to refresh chroma sample values within a region of the current picture can be contingent on the post-processor determining that the region is stationary relative to a previous picture in display order.

Figure 12:
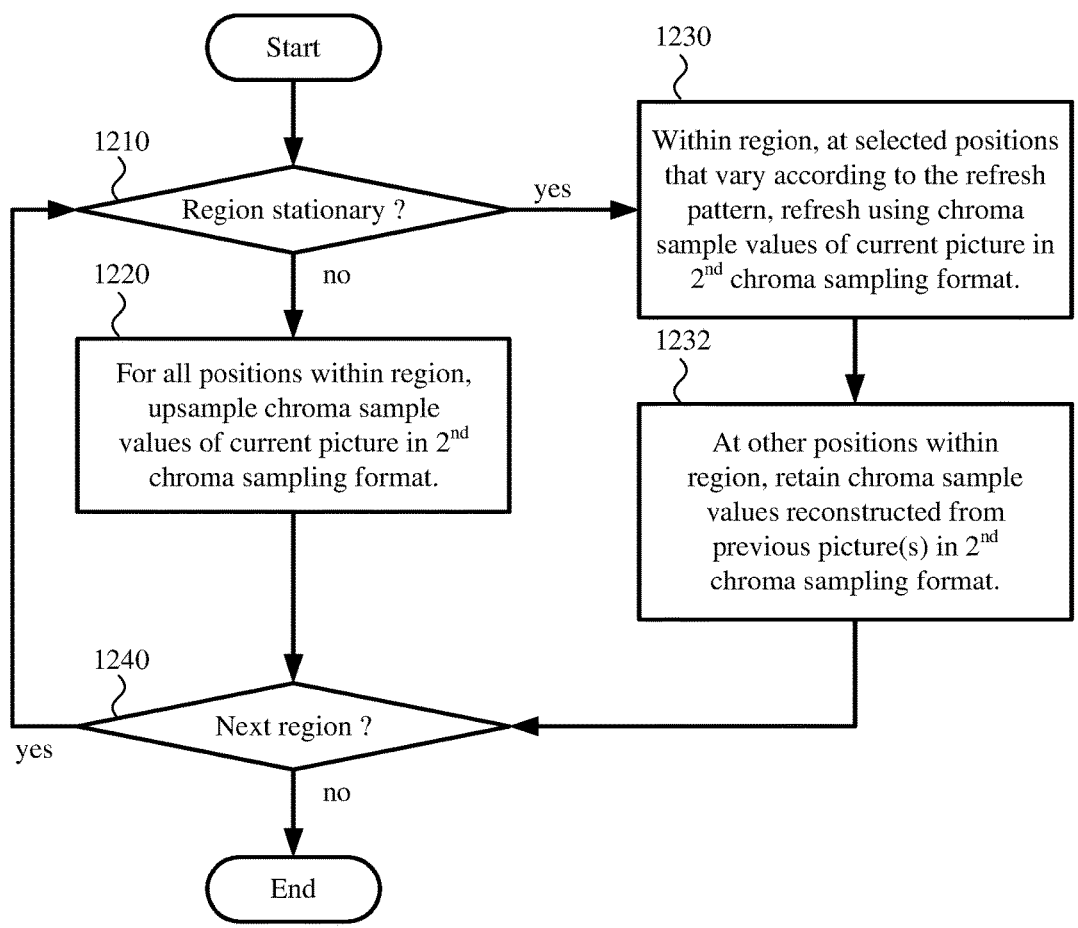
FIG. 12 is a flowchart illustrating an example technique for selective upsampling and/or refresh of chroma sample values on a region-by-region basis.

FIG. 12 shows an example technique (1200) for selective upsampling and/or refresh of chroma sample values on a region-by-region basis. The post-processor can perform the technique (1200) when converting (1120) the current picture to the first (higher-resolution) chroma sampling format.

For each of one or more regions of the current picture, the post-processor checks (1210) whether the region of the current picture is stationary. The post-processor can determine whether the region of the current picture is stationary in various ways, as described below.

If the region of the current picture is stationary, the post-processor performs various operations within the region of the current picture. Starting from the reconstructed chroma sample values of the previous picture in display order, at selected positions within the region, among positions of the first (higher-resolution) chroma sampling format, the post-processor refreshes (1230) chroma sample values in the first chroma sampling format using chroma sample values of the current picture in the second (lower-resolution) chroma sampling format. The selected positions vary according to a refresh pattern that facilitates recovery of stationary content at the first chroma sampling rate. Examples of refresh patterns are described above. At other, non-selected positions within the region, among the positions of the first chroma sampling format, the post-processor retains (1232) chroma sample values reconstructed from one or more previous pictures, in display order, in the second chroma sampling format. (Such chroma sample values reconstructed from the previous picture(s) in the second chroma sampling format are the reconstructed chroma sample values of the previous picture in display order, in the first chroma sampling format.)

On the other hand, if the region of the current picture is not stationary, within the region of the current picture, for all of the positions of the first (higher-resolution) chroma sampling format, the post-processor upsamples (1220) the chroma sample values of the current picture in the second (lower) chroma sampling format.

The post-processor checks (1240) whether to continue for another region of the current picture. If so, the post-processor checks (1210) whether the next region of the current picture is stationary.

With reference to FIG. 11, the post-processor checks (1130) whether to continue with the next picture. If so, the post-processor receives (1110) the next picture (as the current picture) in the second chroma sampling format. In this way, the post-processor can repeat the receiving (1110) and converting (1120) operations for each of one or more subsequent pictures, treating each subsequent picture as the current picture.

Before the post-processing of the current picture, a video decoder can receive, as part of a bitstream, encoded data. The video decoder can decode the encoded data, thereby reconstructing the current picture in the second chroma sampling format.

The post-processor can receive and use pattern metadata. The pattern metadata indicates, for the refresh pattern as applied for the current picture, which of the chroma sample values of the current picture in the first (higher-resolution)

chroma sampling format have been retained for the current picture in the second (lower-resolution) chroma sampling format. Examples of pattern metadata are described above. The post-processor can use the pattern metadata to identify, for the current picture, the selected positions among the positions of the first chroma sampling format. Alternatively, the post-processor does not receive or use pattern metadata, instead relying on a refresh pattern defined at the pre-processor and post-processor.

The post-processor can also receive and use region change metadata. The region change metadata indicates whether one or more regions (of the current picture), respectively, are stationary or non-stationary relative to a previous picture in display order. For each of the one or more regions, the post-processor can use the region change metadata to determine whether the region is stationary or non-stationary relative to the previous picture.

Alternatively, the post-processor does not receive or use region change metadata. Instead, the post-processor determines whether regions are stationary or non-stationary using information available after decoding (e.g., reconstructed luma sample values). For example, the determination of whether a region is stationary or non-stationary can be based at least in part on results of comparing reconstructed luma sample values in the region with corresponding reconstructed luma sample values of a co-located region in the previous picture. The post-processor can directly check for changes in reconstructed luma sample values between the current picture and previous picture. If the reconstructed luma sample values are unchanged, the region is deemed to be stationary. Otherwise (at least one reconstructed luma sample value is different), the region is deemed to be non-stationary.

Or, when determining whether a region of the current picture is stationary, the post-processor can account for possible reconstruction error (e.g., due to different levels of quantization between the current picture and previous picture). For example, the post-processor determines a count of how many of the reconstructed luma sample values in the region have changed compared to the corresponding reconstructed luma sample values of the co-located region in the previous picture. The post-processor then compares the count to a threshold, which depends on implementation. If the count satisfies (e.g., is less than) the threshold, the region is stationary. Otherwise, the region is non-stationary. Alternatively, the post-processor can calculate a distortion measure (e.g., SAD) between reconstructed luma sample values of the region and co-located region, then compare that distortion measure to an implementation-dependent threshold.

Alternatively, the determination by the post-processor of whether a region is stationary or non-stationary can be made in some other way. For example, the post-processor can receive hint information from a decoder, indicating which regions have changed.

In some example implementations, the post-processor stores, in a buffer, a previous picture in display order in the first (higher-resolution) chroma sampling format. The previous picture in the first chroma sampling format includes the chroma sample values reconstructed from the previous picture(s) in the second chroma sampling format. During chroma upsampling and refresh operations for the current picture, the post-processor selectively updates the chroma sample values in the buffer. If the current picture is an intra-coded picture, the post-processor replaces all of the chroma sample values in the buffer by upsampling the chroma sample values of the current picture in the second (lower-resolution) chroma sampling format. Otherwise, for a non-stationary region of the current picture, the post-processor replaces the region's chroma sample values in the buffer by upsampling the region's chroma sample values of the current picture in the second (lower-resolution) chroma sampling format. The upsampled chroma sample values can be filtered to mitigate discontinuities or artifacts (e.g., using a lowpass filter). Otherwise, for a stationary region of the current picture, the post-processor refreshes the region's chroma sample values at selected positions (according to a refresh pattern) with appropriate chroma sample values of the current picture in the second (lower-resolution) chroma sampling format.

E. Alternatives.

In many of the examples described herein, chroma sample values of pictures in a YUV 4:4:4 format are sub-sampled into a YUV 4:2:0 format. Alternatively, chroma sample values of pictures in a YUV 4:4:4 format can be sub-sampled into a YUV 4:2:2 format, for encoding and decoding using a codec adapted for 4:2:2 video content. In this case, the chroma sub-sampling has a ratio 2:1 horizontally, and results in a decrease of 50% in the number of chroma sample values. According to a refresh pattern for chroma sub-sampling and selective refresh operations, selected positions for a current picture can be one half of the positions of the YUV 4:4:4 format. For example, according to the refresh pattern, the selected positions are alternating positions in each line of the positions of the YUV 4:4:4 format, such that the selected positions for the current picture are (1) even positions of each line of the positions of the YUV 4:4:4 format or (2) odd positions of each line of the positions of the YUV 4:4:4 format.

Many of the examples described herein involve variations of YUV color spaces such as Y'UV, YIQ, Y'IQ, YDbDr, YCbCr, YCoCg, etc. in sampling ratios such as 4:4:4, 4:2:2, 4:2:0, etc., as the chroma sampling formats. Alternatively, the described approaches can be used for color spaces such as RGB, GBR, etc. in sampling ratios such as 4:4:4, 4:2:2, 4:2:0, etc., as the chroma sampling formats. For example, a pre-processor can retain chroma sample values of a higher-resolution non-YUV chroma sampling format (such as RGB 4:4:4 or GBR 4:4:4) in pictures of a lower-resolution chroma sampling format (such as a 4:2:0 format), which may then be encoded. In the encoding, the nominally luma component and nominally chroma components represent sample values of the non-YUV components (rather than approximate brightness and chroma values). In corresponding post-processing, a post-processor recovers pictures of the higher-resolution non-YUV chroma sampling format (such as RGB 4:4:4 or GBR 4:4:4) from pictures of the lower-resolution chroma sampling format (such as a 4:2:0 format).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processing units and memory, wherein the computer system implements a video processing tool configured to perform operations comprising:

receiving a current picture in a first chroma sampling format that has a first chroma sampling rate, wherein the current picture includes one or more regions;

for each of the one or more regions, determining whether the region is stationary or non-stationary relative to a previous picture in display order;

outputting region change metadata that indicates whether the one or more regions, respectively, are stationary or non-stationary relative to the previous picture; and converting the current picture to a second chroma sampling format that has a second chroma sampling rate lower than the first chroma sampling rate, including:

retaining chroma sample values of the current picture in the first chroma sampling format that are at selected positions among positions of the first chroma sampling format, wherein the selected positions vary according to a refresh pattern that facilitates recovery of stationary content at the first chroma sampling rate; and discarding chroma sample values of the current picture in the first chroma sampling format that are at other, non-selected positions among the positions of the first chroma sampling format.

2. The system of claim 1, wherein the operations further comprise:

with a video encoder, encoding the current picture converted to the second chroma sampling format, thereby producing encoded data; and outputting the encoded data as part of a bitstream.

3. The system of claim 1, wherein the operations further comprise, for each of one or more subsequent pictures, repeating the receiving, the determining, the outputting, and the converting for the subsequent picture as the current picture.

4. The system of claim 1, wherein the operations further comprise:

outputting pattern metadata that indicates, for the refresh pattern as applied for the current picture, which of the chroma sample values of the current picture in the first chroma sampling format have been retained for the current picture in the second chroma sampling format.

5. The system of claim 1, wherein the determining whether the region is stationary or non-stationary relative to the previous picture is based at least in part on:

information from an operating system component indicating which of the one or more regions has changed relative to the previous picture; or results of comparing chroma sample values in the region with corresponding chroma sample values of a co-located region in the previous picture.

6. The system of claim 1, wherein, according to the refresh pattern:

the selected positions vary on a picture-by-picture basis; and/or different positions, among the positions of the first chroma sampling format, are the selected positions for different pictures of a set of pictures that includes the current picture, such that all of the positions of the first chroma sampling format are represented, collectively, with the selected positions for the different pictures of the set of pictures.

7. The system of claim 1, wherein, according to the refresh pattern:

the selected positions are one quarter of the positions of the first chroma sampling format, wherein the selected positions are alternating positions in alternating lines of the positions of the first chroma sampling format, such that the selected positions are: (a) even positions of even lines, (b) odd positions of even lines, (c) even positions of odd lines, or (d) odd positions of odd lines, of the positions of the first chroma sampling format; or the selected positions are one half of the positions of the first chroma sampling format, wherein the selected positions are alternating positions in each line of the positions of the first chroma sampling format, such that the selected positions are even positions or odd positions of each line of the positions of the first chroma sampling format.

8. The system of claim 1, wherein:

the first chroma sampling format is YUV 4:4:4 format, and the second chroma sampling format is YUV 4:2:2 format, YUV 4:2:0 format, or YUV 4:1:1 format; or the first chroma sampling format is YUV 4:2:2 format, and the second chroma sampling format is YUV 4:2:0 format or YUV 4:1:1 format.

9. In a computer system, a method of processing video in a first chroma sampling format that has a first chroma sampling rate, the method comprising:

receiving a current picture in a second chroma sampling format that has a second chroma sampling rate lower than the first chroma sampling rate; and converting the current picture to the first chroma sampling format, including, for a given region among multiple regions of the current picture:

determining that the given region of the current picture is stationary;

within the given region of the current picture, at selected positions among positions of the first chroma sampling format, refreshing chroma sample values in the first chroma sampling format using chroma sample values of the current picture in the second chroma sampling format, wherein the selected positions vary according to a refresh pattern that facilitates recovery of stationary content at the first chroma sampling rate, and wherein the refreshing is contingent on the given region of the current picture being stationary; and within the given region of the current picture, at other, non-selected positions among the positions of the first chroma sampling format, retaining chroma sample values reconstructed from one or more previous pictures, in display order, in the second chroma sampling format, wherein the retaining is contingent on the given region of the current picture being stationary.

10. The method of claim 9, wherein the converting the current picture to the first chroma sampling format further includes, for each of one or more other regions among the multiple regions of the current picture:

determining whether the other region of the current picture is stationary;

if the other region of the current picture is stationary, within the other region of the current picture:

at selected positions among the positions of the first chroma sampling format, refreshing chroma sample values in the first chroma sampling format using chroma sample values of the current picture in the second chroma sampling format, wherein the selected positions vary according to the refresh pattern; and at other, non-selected positions among the positions of the first chroma sampling format, retaining chroma sample values reconstructed from the one or more previous pictures, in display order, in the second chroma sampling format;

if the other region of the current picture is not stationary, within the other region of the current picture, for all of the positions of the first chroma sampling format, upsampling the chroma sample values of the current picture in the second chroma sampling format.

11. The method of claim 9, further comprising:
receiving, as part of a bitstream, encoded data; and
with a video decoder, decoding the encoded data, thereby reconstructing the current picture in the second chroma sampling format.

12. The method of claim 9, further comprising, for each of one or more subsequent pictures, repeating the receiving the current picture and the converting for the subsequent picture as the current picture.

13. The method of claim 9, further comprising:
receiving pattern metadata that indicates, for the refresh pattern as applied for the current picture, which of the chroma sample values of the current picture in the first chroma sampling format have been retained for the current picture in the second chroma sampling format; and
using the pattern metadata to identify, for the current picture, the selected positions among the positions of the first chroma sampling format.

14. The method of claim 9, further comprising:
storing, in a buffer, a previous picture, in display order, in the first chroma sampling format, the previous picture in the first chroma sampling format including the chroma sample values reconstructed from the one or more previous pictures in the second chroma sampling format.

15. The method of claim 9, wherein, according to the refresh pattern:
the selected positions vary on a picture-by-picture basis; and/or
different positions, among the positions of the first chroma sampling format, are the selected positions for different pictures of a set of pictures that includes the current picture, such that all of the positions of the first chroma sampling format are represented, collectively, with the selected positions for the different pictures of the set of pictures.

16. One or more computer-readable media storing computer-executable instructions for causing a computer system, when programmed thereby, to perform operations to process video in a first chroma sampling format that has a first chroma sampling rate, the operations comprising:
receiving a current picture in a second chroma sampling format that has a second chroma sampling rate lower than the first chroma sampling rate; and
converting the current picture to the first chroma sampling format, including, for each of one or more regions of the current picture:
determining whether the region of the current picture is stationary;
if the region of the current picture is stationary, within the region of the current picture:
at selected positions among positions of the first chroma sampling format, refreshing chroma sample values in the first chroma sampling format using chroma sample values of the current picture in the second chroma sampling format, wherein the selected positions vary according to a refresh pattern that facilitates recovery of stationary content at the first chroma sampling rate; and
at other, non-selected positions among the positions of the first chroma sampling format, retaining chroma sample values reconstructed from one or more previous pictures, in display order, in the second chroma sampling format; and
if the region of the current picture is not stationary, within the region of the current picture, for all of the positions of the first chroma sampling format, upsampling the chroma sample values of the current picture in the second chroma sampling format.

17. The one or more computer-readable media of claim 16, wherein the operations further comprise:
receiving region change metadata that indicates whether the one or more regions, respectively, are stationary or non-stationary relative to a previous picture in display order in the first chroma sampling format; and
using the region change metadata to determine, for each of the one or more regions, whether the region is stationary or non-stationary relative to the previous picture in the first chroma sampling format.

18. The one or more computer-readable media of claim 16, wherein the determining whether the region is stationary includes:
determining a count of how many reconstructed luma sample values in the region have changed compared to corresponding reconstructed luma sample values of a co-located region in an immediately previous picture, in display order, among the one or more previous pictures, in display order, in the second chroma sampling format; and
comparing the count to a threshold.

19. The one or more computer-readable media of claim 16, wherein the operations further comprise:
storing, in a buffer, a previous picture, in display order, in the first chroma sampling format, the previous picture in the first chroma sampling format including the chroma sample values reconstructed from the one or more previous pictures in the second chroma sampling format.

20. The method of claim 9, further comprising:
receiving region change metadata that indicates whether the multiple regions, respectively, are stationary or non-stationary relative to a previous picture, in display order, in the first chroma sampling format; and
using the region change metadata to determine, for each of the multiple regions, whether the region is stationary or non-stationary relative to the previous picture in the first chroma sampling format.

21. The method of claim 9, wherein the determining that the given region is stationary includes:
determining a count of how many reconstructed luma sample values in the given region have changed compared to corresponding reconstructed luma sample values of a co-located region in an immediately previous picture, in display order, among the one or more previous pictures, in display order, in the second chroma sampling format; and
comparing the count to a threshold.

* * * * *